United States Patent [19]

Fukushima et al.

[11] Patent Number: 5,507,026
[45] Date of Patent: Apr. 9, 1996

[54] ADDRESS-TRANSLATABLE GRAPHIC PROCESSOR, DATA PROCESSOR AND DRAWING METHOD WITH EMPLOYMENT OF THE SAME

[75] Inventors: Tadashi Fukushima; Shigeru Matsuo, both of Hitachi; Shoji Yoshida, Zama; Tooru Komagawa, Hitachi, all of Japan

[73] Assignee: Hitachi, Ltd., Tokyo, Japan

[21] Appl. No.: 301,016

[22] Filed: Sep. 6, 1994

Related U.S. Application Data

[63] Continuation of Ser. No. 596,366, Oct. 12, 1990, Pat. No. 5,369,744.

[30] Foreign Application Priority Data

Oct. 16, 1989 [JP] Japan .................................. 1-266142
Oct. 16, 1989 [JP] Japan .................................. 1-266143

[51] Int. Cl.$^6$ ........................................... G06F 15/16
[52] U.S. Cl. ........................ 395/163; 395/164; 395/166; 395/412
[58] Field of Search .................... 395/162–166, 395/275, 325, 400, 425, 725, 800, 412; 345/185, 200, 203

[56] References Cited

U.S. PATENT DOCUMENTS

| | | | |
|---|---|---|---|
| 4,737,909 | 4/1988 | Harada | 364/200 |
| 4,791,580 | 12/1988 | Sherrill et al. | 395/164 |
| 4,860,192 | 8/1989 | Sachs et al. | 364/200 |
| 5,369,744 | 11/1994 | Fukushima et al. | 395/162 |

FOREIGN PATENT DOCUMENTS

63-91787  12/1992  Japan .............................. G06F 15/72

OTHER PUBLICATIONS

Wescon Technical Papers, Oct. 1984, "Graphic Display Processor to Integrate Drawing Algorithm and Display Controls" by Katsura et al.

*Primary Examiner*—Mark R. Powell
*Assistant Examiner*—Kee M. Tung
*Attorney, Agent, or Firm*—Antonelli, Terry, Stout & Kraus

[57] ABSTRACT

In a graphic processing system, there are provided a main memory, a buffer containing a bit map memory for holding display data, a central processing unit for performing a data process involving a translation from a virtual address into a physical address so as to access the main memory, a graphic processor connected to the main memory and buffer, for processing data into a display form, and a system bus interface connected to the central processing unit, main memory and graphic processor, capable of exchanging the data among them. Furthermore, the graphic processing system includes a drawing processing unit connected to the system bus interface, for translating the virtual address into the physical address so as to access the main memory and to process the data, a bus arbitrator for performing arbitration between demands for using the interface given from the central processing unit and graphic processor, and a suspend circuit for asserting a signal requesting that the interface is released to the central processing unit.

18 Claims, 24 Drawing Sheets

GRAPHIC PROCESSOR

PAGING MODEL

FIG. 6 DRAWING PROCESSING UNIT DPU

FIG. 7 MEMORY MANAGEMENT UNIT MMU

BUS CONTROL UNIT BCU

FIG. 9 CRT CONTROL UNIT (CRT-CCU)

FIG. 10 GRAPHIC PROCESSING

EXECUTION OF DRAWING COMMAND

FIG. 14 SYSTEM ARRANGEMENT

FIG. 15 BUS PRIORITY ACQUISITION AND MEMORY ACCESS BY GRAPHIC PROCESSOR

FIG. 16 OCCURRENCE OF INTERRUPTION TO MPU WHILE SYSTEM BUS IS USED BY GRAPHIC PROCESSOR

FIG. 17 ACCESS TO MAIN MEMORY BY GRAPHIC PROCESSOR

CONTROL OF SUS# SIGNAL

SUS# SIGNAL CONTROL LOGIC

SUS# SIGNAL CONTROL

FIG. 22 ASSERTING IRQ# SIGNAL BY SUS# SIGNAL

FIG. 24  NEGATING OF SUS# SIGNAL

NEGATING PROCESS FOR SUS# SIGNAL BY MPU

ADDRESS-TRANSLATABLE GRAPHIC PROCESSOR, DATA PROCESSOR AND DRAWING METHOD WITH EMPLOYMENT OF THE SAME

This is a continuation of application Ser. No. 07/596,366 filed on Oct. 12, 1990 U.S. Pat. No. 5,369,744.

BACKGROUND OF THE INVENTION

The present invention relates to a data processing apparatus for processing bit map data, a method for processing the bit map data in this data processing apparatus, and a graphic processor for constituting this processing method, and also a graphic processing system.

In conventional data processing apparatuses, the following two methods have been employed when bit map data stored into a main memory is processed. According to one method, a central processing unit directly accesses the main memory so as to update the bit map data. In accordance with the other method, a graphic processor exclusively used for processing the bit map data is prepared, and the main memory is accessed by this graphic processor in order to update the bit map data, as described in the pending patent application Ser. No. 905, 173 entitled "GRAPHIC PROCESSING SYSTEM", filed by K. Katsura et al. on Sep. 9, 1986, the disclosure of which is incorporated herein by reference.

In the first-mentioned method, if the address space of the main memory has not yet been made virtual or virtually processed, the central processing unit calculates the physical address of the data to be processed and accesses this data. To the contrary, if the address space of the main memory has been virtually processed, the virtual address of the data to be processed is first calculated by the memory management unit employed by the central processing unit, and the main memory is accessed after this virtual address is translated into the physical address. At this time, if no data to be processed is present in the main memory, the central processing unit accesses this data after the necessary data has been read out from the secondary storage unit and supplied to the main memory.

On the other hand, in the latter-mentioned method, the graphic processor accesses the main memory in accordance with the instruction from the central processing unit. At this time, only typical points of the data to be processed are designated by the physical information of the main memory. In other words, existence of the respective data to be processed has been calculated by employing the internal calculating circuit by the graphic processor based upon the information on the given typical points. Since the address information of the typical points given to the graphic processor correspond to the physical address, the address information on the respective data to be processed, which is calculated by the graphic processor, similarly corresponds to the physical address, so that the graphic processor can directly access the main memory without using the central processing unit. At this time, if the address space of the main memory has not yet been virtually processed, no specific care is required. To the contrary, if the address space of the main memory has been virtually processed, the central processing unit must instruct the graphic processor to perform the drawing operation in a unit of the address space continued on the main memory. Also, when the main memory is under accessing operation by the graphic processor, care must be taken such that the data to be processed continuously exists on the main memory.

In one Japanese patent publication JP-A-62-62390, there is disclosed the graphic processor for drawing characters on the bit map. Another Japanese patent publication JP-A-63-91789 discloses the graphic processor for transferring the bit map data between the main memory and frame buffer in order to display the multiwindow.

There is a problem that a lengthy data processing time is required for the bit map data when the central processing unit solely accesses the main memory. To achieve highspeed data processing, the graphic processors which are exclusively used for processing the bit map data have been invented. However, no specific care has been taken for such a case that the main memory is virtually formed in the conventional graphic processors. As previously described, the drawing instruction must be given in a unit of address space continued on the main memory for these graphic processors. Moreover, further care must be taken that the data to be processed is continuously present in the main memory under the accessing operation to the main memory by the graphic processors. To perform the above-described processings, the workload of the drawing process given to the central processing unit cannot be sufficiently reduced, which may cause the overall performance of the data processor to be lowered. There have been proposed two methods for using the system bus. That is to say, in accordance with the first method, when the data transfer unit such as the direct memory access controlling unit performs the data transfer operation with the main memory for storing therein the processed data by employing the system bus, once the data transfer operation is commenced, the system bus is continuously occupied until this data transfer operation is completed (i.e., burst transfer method). In accordance with the second method, the occupation rate of the system bus is previously set, and both the central processing unit and data transfer unit alternately use the system bus (i.e., cycle steal method.)

In the burst transfer method, there is a small software overhead to arbitrate the system bus and also the higher data transfer efficiency can be expected, as compared with the cycle steal method. However, there is a problem that the central processing unit cannot execute the process until the processing operation by the data transfer unit is accomplished in case that the central processing until requires performance of the urgent processing operation during the data transfer operation by the data transfer unit due to external reasons and internal reasons of the system. There are further problems that the construction of the bus arbitrator becomes complex and also that a cumbersome procedure is required to restart the system after the data transfer operation by the data transfer unit is interrupted, and the central processing unit occupies the system bus so as to perform the process corresponding to the interruption.

On the other hand, in the cycle steal method, the central processing unit can temporarily execute the process of the data transfer operation. However, there is such a problem that the software overhead for acquiring the system bus by the central processing unit becomes large, the data transfer efficiency is lowered, and also a lengthy processing time is required, as compared with the burst transfer method. These problems may be similarly applied to such a data transfer operation between a main memory and frame buffer, and also to a drawing processing operation by a main memory under a condition that a data transfer unit is substituted by a graphic processor.

SUMMARY OF THE INVENTION

An object of the present invention is to eliminate such a requirement that a central processing unit instructs a drawing to a graphic processor in a unit of continuous address space in a main memory.

Another object of the present invention is to provide a graphic processing system capable of transferring multiwindow display data stored in a main memory to a bit map memory at a high speed so as to be output to a display.

Another object of the present invention is to provide a data processing apparatus in which a graphic processor translates a virtual address of a vertical memory into a physical address, and a central processing unit enables the graphic processor to perform a drawing process which corresponds to a data transfer unit between a main memory and a secondary storage unit and also bridges plural blocks by way of a single instruction.

Another object of the present invention is to provide memory management capable of performing a highspeed data transfer operation between a main memory and a frame buffer of a data processing unit for supporting a virtual storage without employing a memory management function by a central processing unit.

A further object of the present invention is to provide a drawing method, a data trasfer method, a graphic processor for realizing this method and a data processing unit in which a small software overhead is realized, high data transfer efficiency is realized, and also a construction of a bus arbitrator is made simple.

A still further object of the present invention is to provide a display data processing method and also a system thereof wherein such a system that a graphic processor accesses a main memory, since the graphic processor detects an occurrence of interruption to an MPU while accessing a system bus and also release the system bus, after both a drawing process and a data transfer operation are interrupted for the time being and the MPU executes the process, the original process can be restarted without any assistance from software and thus usage efficiency of the system bus can be improved.

Another object of the present invention is to provide a graphic processor, a data processing apparatus for utilizing the same, and also a drawing method in which while a graphic processor accesses a main memory, no care needs to be taken such that data to be processed is continuously present in the main memory and also a workload of the drawing or graphic data process given to a central processing unit is reduced, so that the overall performance of the data processing unit is increased.

To achieve the above-described objects, a major feature of the present invention is as follows. An address translation table for translating a virtual address into a physical address is built in a graphic processor; a mechanism is provided for independently updating a content of this address translation table; and furthermore when data to be processed is present in a main memory, such a mechanism is employed that a demand for reading this data from a secondary storage unit and supplying this data to the main memory is made to the central processing unit.

The graphic processor accesses the bit map data on the main memory in accordance with the instruction given from the central processing unit. At this time, as to the data to be processed, only typical or representative points thereof are instructed by the logical address information. If the address space of the main memory has been virtually formed, the graphic processor calculates locations of the respective data to be processed as the virtual addresses based upon the contents of the drawing instruction and this logical address information. At this time, if the physical address information corresponding to this virtual address is not present within the address translation table, this fact is reported to a bus arbitration controlling unit which will arbitrate a bus access right or bus access priority with another bus arbitrator employed at the system so as to obtain such a bus access right. Thus, the graphic processor per se accesses the main memory to update the content of the address translation table, whereby a physical address of the data to be processed is obtained. When it is recognized that no data to be processed is present in the main memory during the content updating operation of the address translation table, the graphic processor requests the central processing unit to read out the bit map data containing the data to be processed from the secondary storage unit and supply this bit map data to the main memory. After the bit map data reading operation has been completed, the graphic processor executes updating the content of the address translation table. After the content of the address translation table has been updated and the physical address of the data to be processed has been acquired, the bus arbitration controlling unit newly arbitrates with the bus arbitrator employed at the system side so as to establish the bus access right, and performs the drawing process to the bit map on the main memory based upon the above-described physical address.

With the above-described process operation, even when the main memory has been virtually formed, after receiving the drawing instruction from the central processing unit, the graphic processor can perform the drawing process on the bit map of the main memory without requesting the memory management function of the central processing unit. In other words, even when the address space of the main memory has been virtually formed, the central processing unit must no longer instruct the graphic processor to perform the drawing process in a unit of the continuous address space over the main memory, which is similar to a case wherein the address space of the main memory has not yet been virtually formed.

Also, even when there is no bit map data to be processed in the main memory when the central processing unit instructs the drawing process to the graphic processor, if the data to be processed is once loaded on the main memory, the central processing unit per se performs such a procedure that this data is not saved from the main memory into the secondary storage unit. Accordingly, even if detection is made that no data to be processed is present in the main memory during the execution of the drawing process by the graphic processor, since the graphic processor is equipped with such a mechanism for demanding the central processing unit to read out the data from the secondary storage unit and supply the read data to the main memory, no specific care must be taken by the central processing unit in such a manner that the data to be processed always exists in the main memory while accessing the main memory by the graphic processor.

To the graphic processor, there are provided an input terminal for exclusively and externally receiving controls to interrupt and restart executions of process operations for the main memory; means for detecting a demand of urgent processes to the central processing unit; and, means for detecting the completion of this process operation.

Furthermore, to construct a simple bus arbitrator, an output terminal for externally announcing an end of an exception process is provided with the central processing unit. Also, to accept such a case that the central processing unit has no such output terminal, either means for externally reporting a priority level of the exception process under execution, or a function equivalent to this means is provided with this central processing unit.

In response to the signal derived from the input terminal which exclusively and externally receives the controls to interrupt and restart execution of the process operations for the main memory, the graphic processor can detect not only the urgent process demand to the central processing unit, but also the completion of this process operation. As to this signal, if there is provided such an output terminal for externally reporting the end of the exception process to the central processing unit, an output signal derived from this output terminal may be utilized. To the contrary, if there is no such output terminal, a signal derived from the means for externally announcing the priority level of the exception process under execution is decoded so as to produce such a signal. In accordance with this signal, the graphic processor can detect the urgent process operation for the central processing unit, namely the occurrence and end of the exception process having the higher priority level while performing the process operation to the main memory. After temporarily interrupting the drawing process operation and data transfer process, the central processing unit can restart the original process operation without any assistance by the software process, and therefore can quickly accept the urgent process operation thereby.

DESCRIPTION OF THE PREFERRED EMBODIMENTS

Referring now to drawings, various preferred embodiments according to the present invention will be described. It should be noted that same reference numbers shown in the respective figures denote the same or similar circuit elements.

SYSTEM ARRANGEMENT

Figure 1:
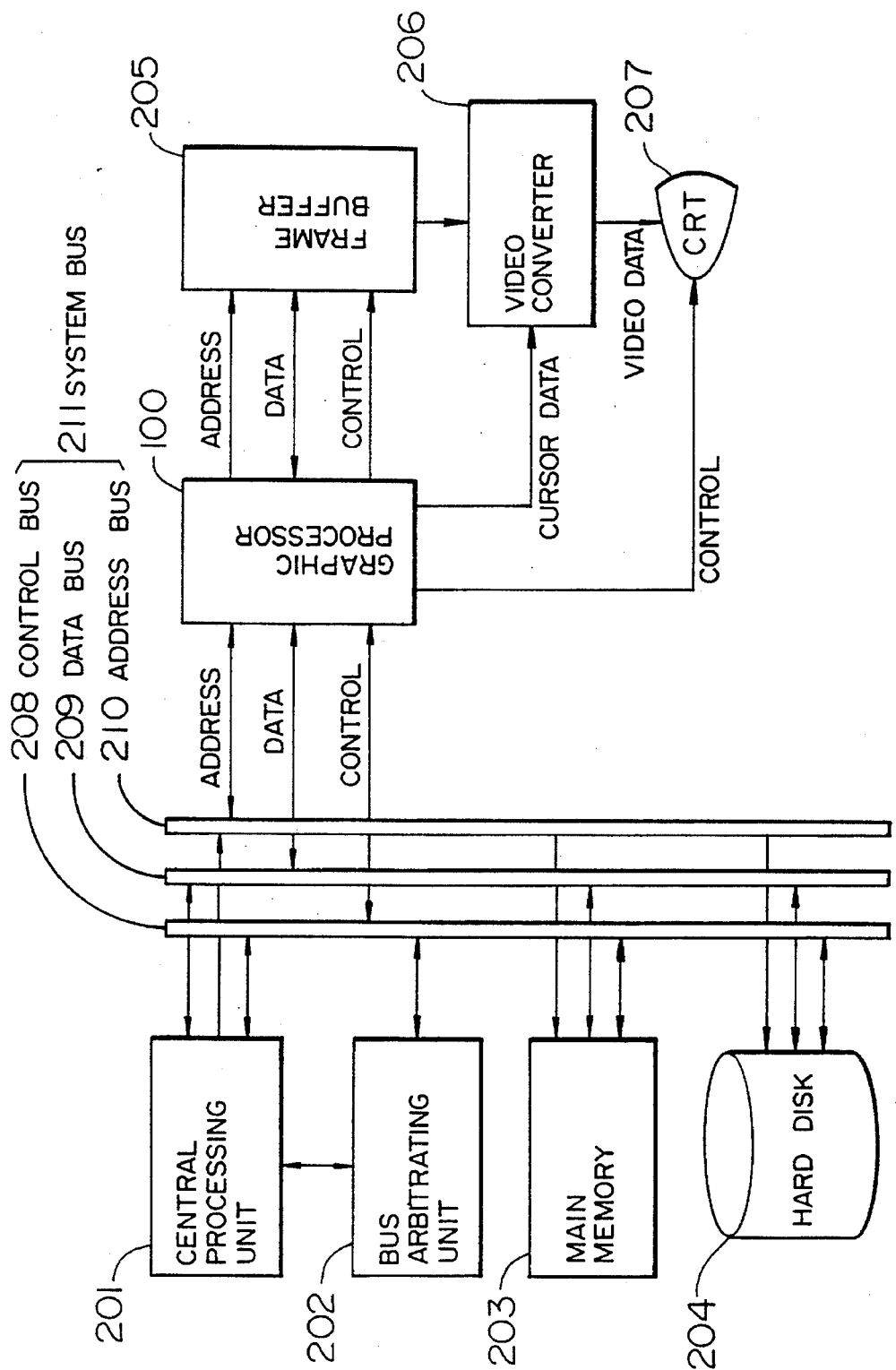
FIG. 1 is a schematic block diagram of a system arrangement of a data processing system according to a preferred embodiment of the present invention.

In FIG. 1, there is shown an example of a system arrangement in which the present invention has been embodied. A central processing unit 201, a main memory 203 and a hard disk 204 support a virtual storage. A graphic processor 100 communicates with the central processing unit 201 and the main memory 203 via a system bus 211 constructed of an address bus (AB) 210, a data bus (DB) 209, and a control bus (CB) 208. In case that the graphic processor 100 becomes a bus master so as to access the main memory 203, this graphic processor 100 arbitrates with a bus arbitrator 202 to maintain bus priority of the system bus 211. Then, the graphic processor 100 can directly access a frame buffer (FB) 205, irrelevant to the system bus 211. The graphic processor 100 may access the frame buffer 205 to read/write drawing or plotting data, which is similar to the main memory 203, may output address information for displaying a content of the fram buffer 205 to a CRT display unit (CRT) 207 via a video converter (VC) 206, and also may output address information for refreshing a DRAM which constitutes the frame buffer 205. It should be noted that the graphic processor 100 controls to display a cursor at a new position every time the content of the frame buffer 205 is newly displayed by previously reading cursor data from the frame buffer 205 to thereby output to the video converter 206. Furthermore, the graphic processor 100 outputs a synchronization signal so as to control a display of the CRT display unit 207. It is preferable to manufacture this graphic processor 100 as a large-scale integration (abbreviated as an "LSI"). Accordingly, this graphic processor 100 has been manufactured as an LSI in the following preferred embodiment.

PIN CONFIGURATION

Figure 2:
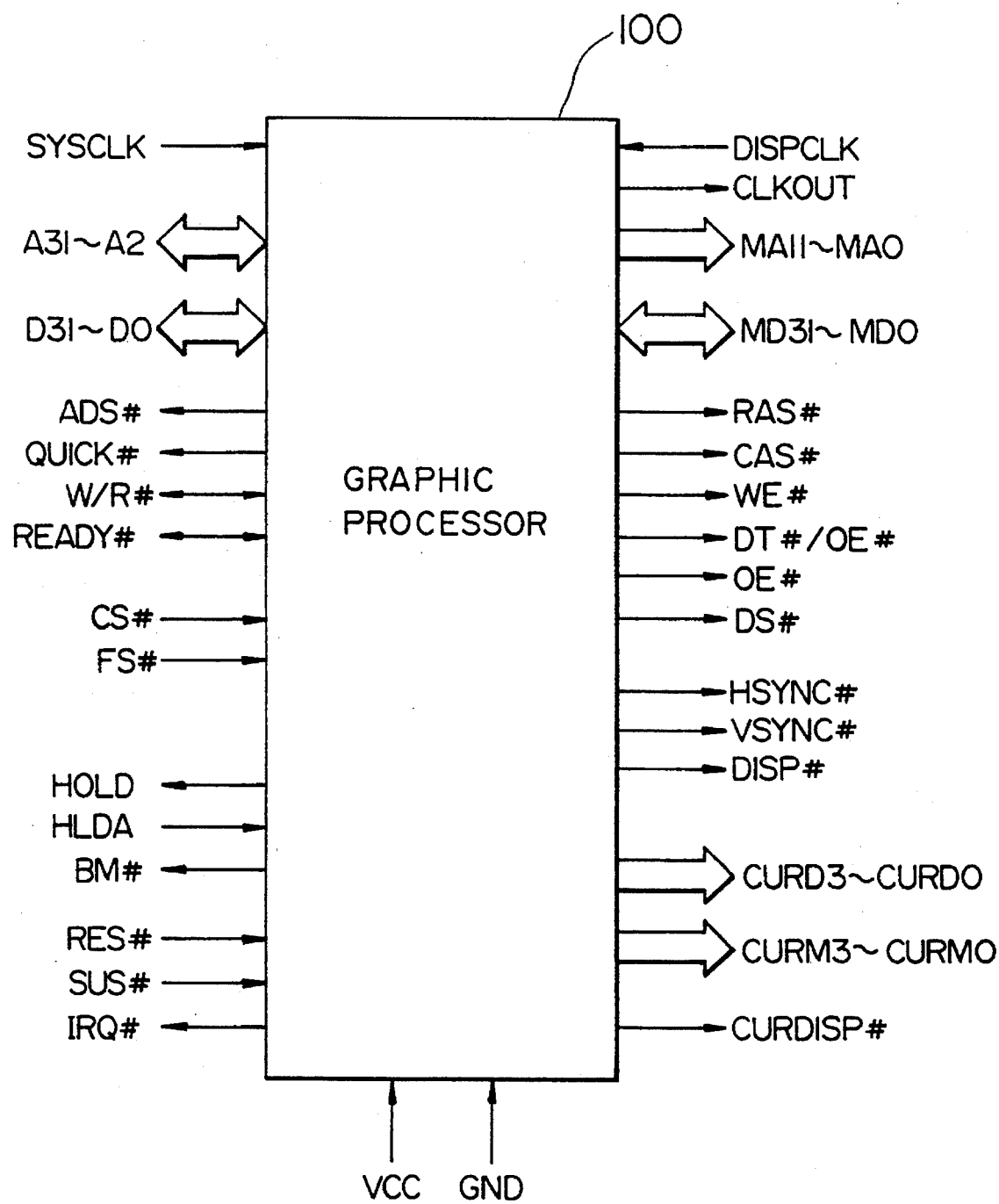
FIG. 2 represents a pin configuration of the graphic professor 100 manufactured as an LSI.

FIG. 2 shows a pin configuration of the graphic processor 100. A total pin number other than those for a power supply (VCC) and a ground (GND) becomes 139.

(1) System clock (SYSCLK)

In synchronism with a clock signal input to a pin SYSCLK, all of the processes by the graphic processor 100 are executed.

(2) Address bus (A31-A2)

In case that the graphic processor 100 operates in a slave mode, or fetches a command from CPU 201 to decode it whereby data from CPU 201 is received, pins A31-A2 become address input terminals for the frame buffer 205 or an internal register of the graphic processor 100. Also after the graphic processor 100 has decoded the command, this graphic processor 100 operates as a bus master which sends out a physical address to the main memory, and the graphic processor 100 outputs a physical address of the main memory 203.

(3) Data bus (D31-D0)

When the graphic processor 100 operates as the slave mode, pins D31 to D0 become data input terminals (pins) during writing operation to the internal register of the graphic processor 100, and become data output terminals during reading operation from the internal register thereof. When the graphic processor 100 operates as the bus master, these pins D31 to D0 become data output terminals during the writing operation to the main memory 203, and become data input terminals during the reading operation from the main memory 203.

(4) Address status (ADS#)

A pin "ADS#" is brought into a high impedance state when the graphic processor 100 operates in the slave mode, and becomes an output terminal representing that the data on the address bus (A31-A2) has been defined when the graphic processor 100 operates as the bus master. A symbol # indicates a low-active signal.

(5) Quick (QUICK#)

A pin "QUICK#" is an output terminal indicating whether or not the graphic processor 100 accesses the main memory 203 at a high access speed by employing a static column mode. During the static column mode, one row address is stored, and is combined with each of a plurality of subsequent row addresses to read or write corresponding memory data.

(6) Write/read (W/R#)

A pin "W/R#" indicates a writing operation to the internal register of the graphic processor 100 if a "Low" level is input when the graphic processor 100 operates in the slave mode, and also represents a reading operation from the internal register of the graphic processor 100 if a "High" level is input. When the graphic processor 100 operates as a bus master, a "High" level signal is output from this write/read pin during the writing operation to the main memory 203 and a "Low" level signal is output therefrom during the reading operation from the main memory 203.

(7) Data ready (READY#)

A pin "READY#" corresponds to an output terminal representing that the data on the data buses (D31-D0) have been defined in case the graphic processor 100 is operated in the slave mode, and also to an input terminal indicating that the data on the data bus (D31-D0) have been defined in case the graphic processor 100 is operated in the bus master.

(8) Chip select (CS#)

Only when a "Low" level signal is input to a pin "CS#" is the central processing unit 201 accessible to an internal register employed in the graphic processor 100.

(9) Frame buffer select (FS#)

Only when a "Low" level signal is input to a pin "FS#" can the central processing apparatus 201 access the frame buffer 205 via the address buses (A31-A2) and also data buses (D31-D0).

(10) Bus hold request (HOLD)

When the graphic processor 100 remands use of the system bus 211, a "Low" level signal is output to a pin "HOLD".

(11) Bus hold acknowledge (HLDA)

When a "Low" level signal is input to a pin "HLDA", it indicates that the system bus 211 has been released to the graphic processor 100. On the other hand, when a "High" level signal is input under such a condition that the graphic processor uses the system bus 211, the graphic processor 100 releases the system bus 211.

(12) Bus master (BM#)

While the graphic processor 100 becomes a bus master so as to use the system bus 211, a "Low" level signal is output to a pin BM#.

(13) Reset (RES#)

When a "Low" level signal is input to a pin "RES#", the graphic processor 100 is initialized.

(14) Suspend (SUS#)

When a "Low" level signal is input to a pin "SUS#", the graphic processor 100 temporarily interrupts an access to the main memory. On the other hand, when a "High" level signal is input to this pin "SUS#" while the graphic processor 100 temporarily interrupts the access to the main memory 203, the accessing operation to this main memory 203 by the graphic processor 100 is restarted.

(15) Interrupt request (IRQ#)

When the graphic processor 100 demands the interrupt process to the center processing unit 201, a "Low" level signal is output to a pin "IRQ#".

(16) Display clock (DISPCLK)

In response to a clock input to a pin "DISPCLK", an internal circuit of the graphic processor 100 is operated which controls a display of the CRT display unit 207 at a half (½) frequency of this clock.

(17) Display reference clock (CLKOUT)

An operation clock from the internal circuit of the graphic processor 100 for controlling the display of the CRT display unit 207 is output to a pin "CLKOUT".

(18) Memory address (MA11-MA0)

At a falling edge of a signal appearing at a pin "RAS" (will be discribed later), a row address of the frame buffer 205 is output to pins "MA11-MA0", whereas at a falling edge of a signal appearing at a pin "CAS" (will be discussed later), a column address of the frame buffer 205 is output to the pins "MA11-MA0".

(19) Memory data (MD31-MD0)

During a writing operation, write data to the frame buffer 205 is output to pins "MD31-MD0", and read data from the frame buffer 205 is input into the pins "MD31-MD0" during a reading operation.

(20) Row address strobe (RAS#)

When an output from a pint "RAS#" is changed from a "High" level into a "Low" level, it is indicated that a row address of the frame buffer 205 is output to the memory address (MA11-MA0).

(21) Column address strobe (CAS#)

When an output from a pin "CAS#" is changed from a "High" level to a "Low" level, it is represented that a column address of the frame buffer 205 is output to the memory address (MA11-MA0).

(21) Write enable (WE#)

When the output from the column address strobe pin (CAS#) is varied from a "High" level into a "Low" level, it indicates a read cycle if the output at the pin "WE#" is a "High" level, whereas it represents a write cycle if the output thereof is a "Low" level.

(23) Data transfer/output enable (DT#/OE#)

A pin "DT#/OE#" corresponds to an output terminal which is used only when a VRAM (2-port DRAM) is utilized for the frame buffer 205. When an output from the row address strobe pin (RAS#) is changed from a "High" level into a "Low" level, if the signal appearing at the pin "DT#/OE#" is at a "Low" level, it indicates such an access for employing a serial input/output (SI/0) (to be displayed on the CRT display unit) of a video RAM (VRAM). If the signal appearing at the pin "DT#/OT#" is at a "High" level, it indicates such an access derived from the graphic processor 100 with employment of an input/output (I/O) of the video RAM (VRAM) for a drawing. Further, when data is written from the graphic processor 100 into the frame buffer 205, which the processor 100 into when the output of the column address strobe pin "CAS#" is changed from a "High" level into a "Low" level, a signal appearing at the pin DT#/OE# becomes a "High" level. On the other hand, when data is read out from the frame buffer 205 into the graphic processor 100, when the output at the column address strobe pin "CAS#" is changed from a "High" level into a "Low" level, a signal appearing at the pin DT#/OE# becomes a "Low" level.

(24) Output enable (OE#)

A pin "OE#" corresponds to an output terminal which is used only when a DRAM is employed in the frame buffer 205. When data is written from the graphic processor 100 into the frame buffer 205, when the output from the column address strobe pin "CAS#" is changed from a "High" level into a "Low" level, a signal appearing at the pin "OE#" becomes a "High" level. On the other hand, when data is read out from the frame buffer 205 into the graphic processor 100, when the output from the column address strobe pin "CAS#" is varied from a "High" level to a "Low" level, a signal appearing at the pin "OE#" becomes a "Low" level.

(25) Display status (DS#)

A "Low" level signal is output to a pin "DS#" only during a time period when the frame buffer 25 is set to a display memory cycle.

(26) Horizontal synchronization (HSYNC#)

To a pin "HSYNC#", a signal for a horizontal synchronization of the CRT display unit 207 is output.

(27) Vertical synchronization (VSYNC#)

To a pin "VSYNC#", a signal for a vertical synchronization of the CRT display unit 207 is output.

(28) Display timing (DISP#)

A time period during which a "Low" level signal is output to a pin "DISP#", represents a screen display time period of the CRT display time period of the CRT display unit 207.

(29) Cursor data (CURD3-CURD0)

Cursor data to be displayed on the CRT display unit 207 is output to a pin "CURD3-CURD0".

(30) Cursor mask data (CURM3-CURM0)

Mask data for displaying a cursor on the CRT display unit 207 is output to a pin "CURM3-CURM0".

(31) Cursor display time (CURDISP#)

A time period during which a "Low" level signal has been output to a pin "CURDISP#" indicates a display time period of the cursor.

INTERNAL ARRANGEMENT

Figure 3:
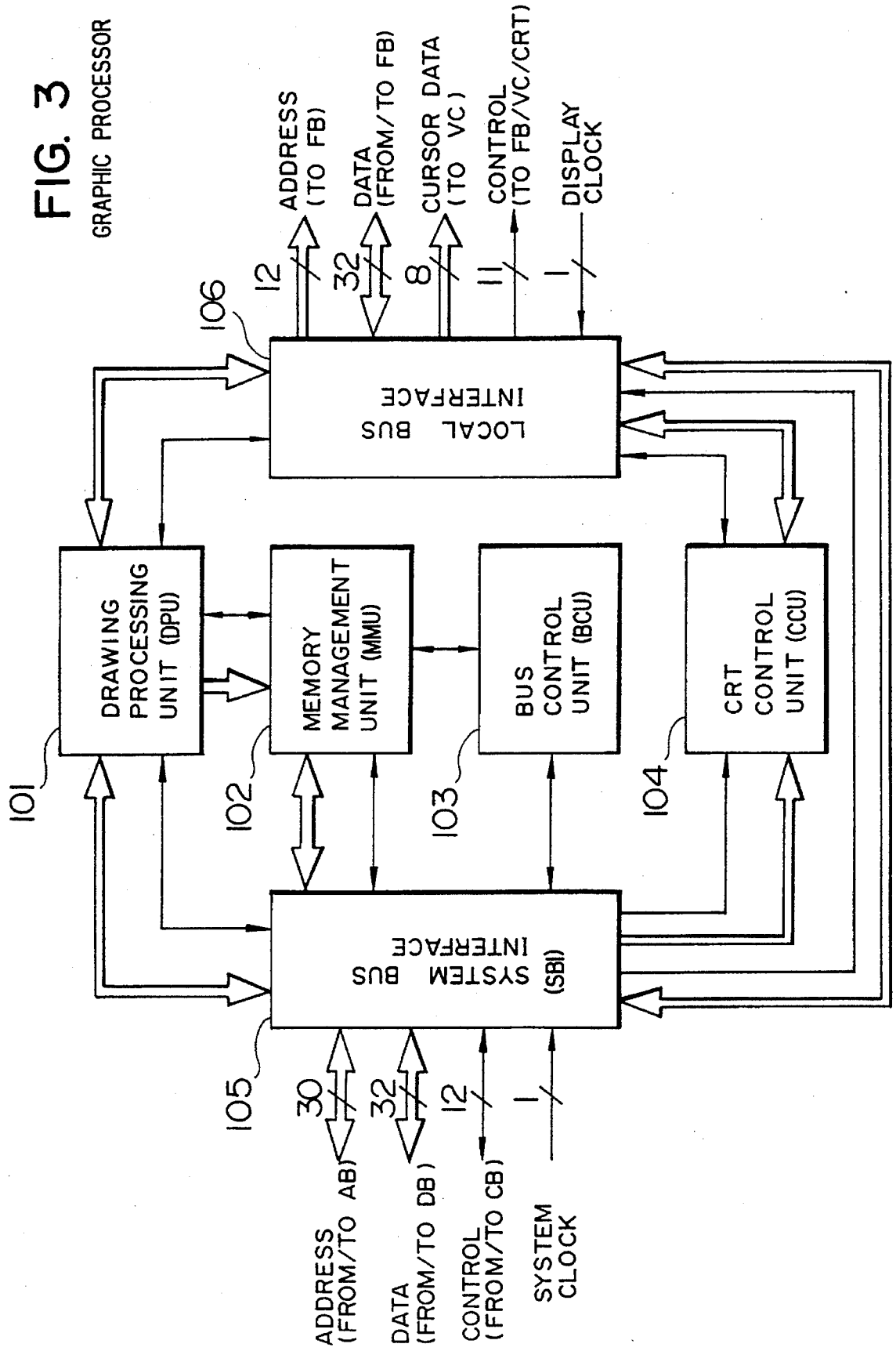
FIG. 3 represents an internal arrangement of the graphic processor 100.

In FIG. 3, there is shown an internal arrangement of the graphic processor 100. The graphic processor 100 is constructed of a drawing processing unit (DPU) 101; a memory management unit (MMU) 102; a bus control unit (BCU) 103; a CRT control unit (CCU) 104; a system bus interface (SBI) 105, and also a local bus interface (LBI) 106.

The drawing processing unit 101 decodes a drawing (plotting) command sent from the system bus interface 105 in order to check whether data to be processed is in the frame buffer or in the main memory, and also calculates an address of this data to be processed. At this time, when the data to be processed is present in the main memory 203, an address thereof is transferred to a memory management unit 102 so as to request fetching of the data to be processed. On the other hand, when this data to be processed is present on the frame buffer 205, an address thereof is transferred to a local bus interface 106 in order to request fetching of this data. The data to be processed is transferred via either a system bus interface 105 or a local bus interface 106 to the drawing processing unit 101. The drawing processing unit 101 processes the fetched data in accordance with the drawing command by utilizing an internal calculator and register thereof. Subsequently, the drawing processig unit 101 calculates a storage address of data which has been processed. If the storage address is present in the main memory 203, the processed data is transferred to the system bus interface 105 and the storage address is transferred to the memory management unit 102 in order that the processed data is stored into the main memory 203. On the other hand, if the storage address is present at the frame buffer 205, both the processed data and storage address are transferred to the local bus interface 106 in order that the processed data is stored into the frame buffer 205.

The memory management unit 102 translates an address (virtual address) transferred from the drawing processing unit 101 into a physical address with reference to an address translation table provided with the memory management unit 102. The physical address translated above is transferred to the system bus interface 105. When accessing the main memory 203 by utilizing this physical address, first of all, it is required to obtain bus priority of the system bus 211. To this end, the memory management unit 102 requests the bus control unit 103 to acquire the bus priority of the system bus 211. Also, when referring the address translation table so as to translate the virtual address into the physical address, when a detection is made that data to be address translated is lost, after the bus control unit 103 has obtained the bus priority of the system bus 211, the memory management unit 102 accesses a certain page table present on the main memory 203 via the system bus interface 105, and modifies the address translation table employed in the memory management unit 102 so as to thereby form necessary address translation data. In this case, when a detection is made that no page frame containing therein either a page table related to the virtual address to be translated or data designated by the virtual address is present on the main memory 203 by way of an existence bit (will be discussed later), the memory management unit 102 commands the bus control unit 103 such that the central processing unit 201 performs a page swapping. Furthermore, when the drawing processing unit 101 writes data into a certain page frame on the main memory 203 at a first instance, the memory management unit 102 sets both an address bit indicating that this certain page frame Has been referred within a table entry on the main memory 203 corresponding to this page frame, and also a change bit representing that the content of this page frame has been changed. Even when the data reading is performed, the memory management unit 102 sets only the above-described access bit in the page table entry on the main memory 203 corresponding to this page frame.

In response to a request made by the memory management unit 102, the bus control unit 103 performs arbitration with the bus arbitrator 202 externally provided with the graphic processor 100 via the system bus interface 105 in order to acquire a bus priority of the system bus 211.

The CRT control unit 104 generates synchronization signals corresponding to two different sorts of the scanning modes, i.e., a noninterlace mode and an interlace sync and video mode and then ouputs these synchronization signals via the local bus interface 106 to the CRT display unit 207. Also, this CRT control unit 104 produces address information so as to refresh both the DRAM and VRAM employed in the frame buffer 205. The address information is output from the memory address (MA11-MA0) via the local bus interface 106. Furthermore, the cursor data defined at the frame buffer 205 is read out from the memory data (MD31-MD0) via the local bus interface 106 and shift-processed. Thereafter this readout cursor data is output from the cursor data (CURD3-CURD0) and cursor mask data (CURM3-CURM0). As a result, a highspeed display of the cursor can be realized.

The system bus interface 105 furnishes the internal clocks for synchronizing the process executions with respect to the respective units within the graphic processor 100, and also communicates with the central processing unit 201, main memory 203, and bus arbitrator 202 externally provided with the graphic processor 100 by employing the address bus (A31-A2); data bus (D31-D0); address status (ADS#); quick (QUICK#); write/read (W/R#); data ready (READY#); chip select (CS#); frame buffer select (FS#); bus hold request (HOLD); bus hold acknowledge (HLDA); bus master (BM#); reset (RES#); suspend (SUS#), and interrupt request (IRQ#). Then, a control register is built in the system bus interface 105 so as to synchronize the processing operations effected in the respective units and also to control the data transfer timings.

While synchronizing between the internal clock supplied from the system bus interface 105 and the display controlling clock input from the pin "DISPCLK", the local bus interface 106 communicates with the frame buffer 205, video converter 206, and CRT display unit 207 externally provided with the graphic processor 100 by employing the display reference clock (CLKOUT); memory address (MA11-MA0); memory data (MD31-MD0); row address strobe (RAS#); column address strobe (CAS#); write enable (WE#); data transfer/output enable (DT#/OE#); output enable (OE#); display status (DS#); horizontal synchronization (HSYNC#); vertical synchronization (VSYNC#); display timing (DISP#); cursor data (CURD3-CURD0); cursor mask data (CURM3-CURM0 ); and cursor display timing (CURDISP#).

PAGING MODEL

Figure 4:
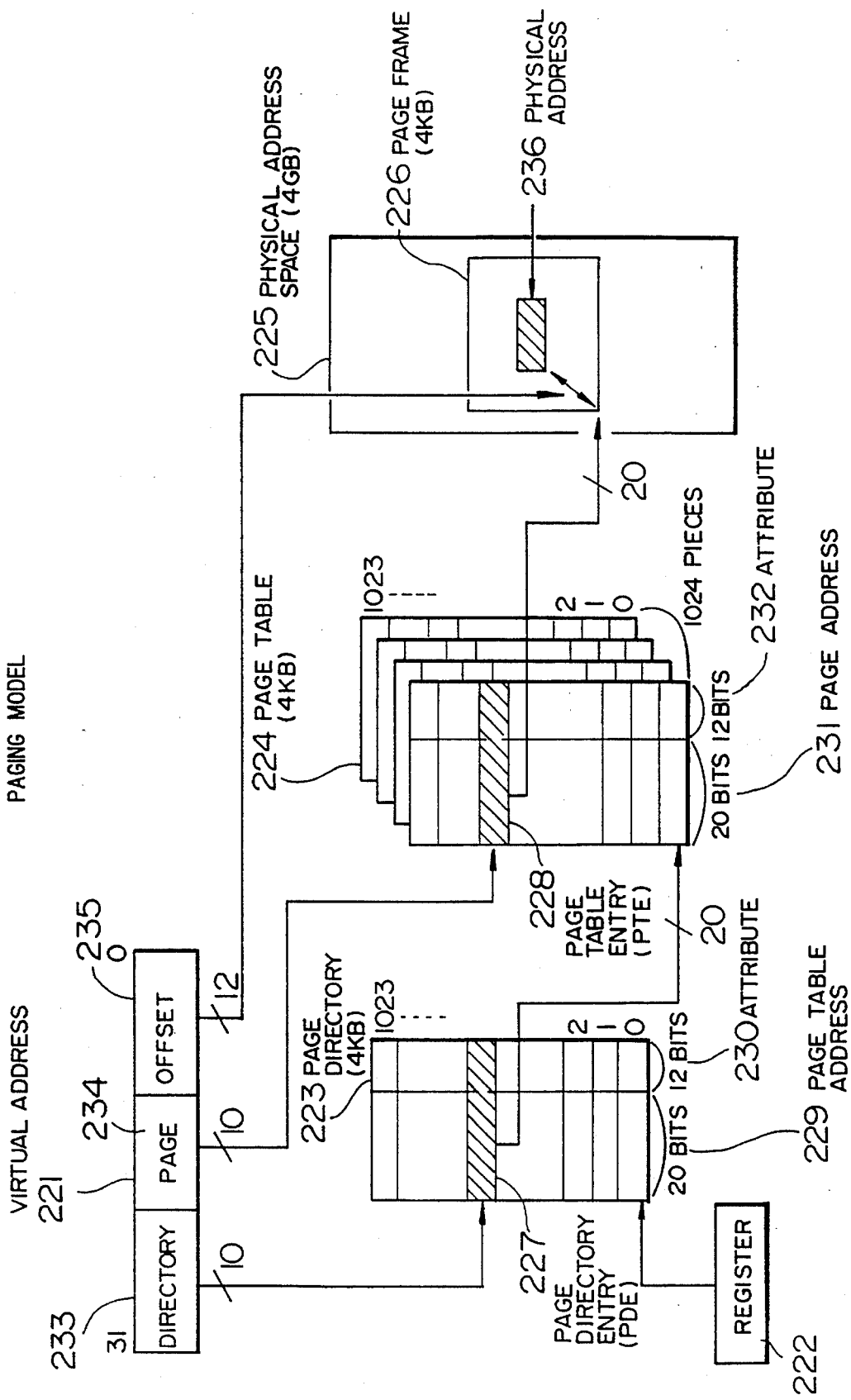
FIG. 4 is an illustration for showing a paging mechanism in the graphic processor 100.

FIG. 4 represents a paging model. In the graphic processor 100, a virtual address 221 is translated into a physical address 236 by means of two-staged address translation tables. A first-staged address translation table corresponds to a page directory 223 and a second-staged address translation table corresponds to a page table 224. There are one page directory 223 and 1024 page table 224, a capacity of each of the page directories 223 and page tables 224 is 4 KB (4096 bytes), and each of them constitutes a single page.

The page directory 223 is resident in the main memory 203 and a base address thereof is addressed by a base address register 222. The page directory 223 is constructed of 1024 pieces of page directory entries (PDE) 227, and the respective page directory entries are selected by the directory 233 corresponding to the upper 10 bits of the virtual address 221. Each of the page directory entries 227 is 4 bytes, the upper 20 bits thereof (bits 31-12) correspond to a page table address 229, and one of 1024 pieces of page tables 224 is selected and a base address thereof is addressed. Lower 12 bits (bits 11-0) of the page directory entry 227 correspond to attribute 230 of the page table 224 addressed by the page table address 229 and storing the present state. In the attribute 230, there is contained an existence bit for indicating whether the page table 224 addressed by the page table address 229 is present on the main memory 203, or on the hard disk 204. Only when the existence bit represents that the corresponding page table 224 exists on the main memory 203, a page table address of this page directory entry 227 is valid.

A single page table 224 is constructed of 1024 pieces of page table entries (PTE) 228. Each of these page table entries 228 is selected by a page 234 corresponding to medium 10 bits (bits 21-12) of the virtual address 221. Each of the page table entries 228 is constructed of 4 bytes, the upper 20 bits (bits 31-12) thereof are a page address 231, and one of the page frames 226 within the physical address space (4 GB at maximum) 225 which is mapped on the main memory 203, is selected and then a base address thereof is addressed. A capacity of a single page frame 226 is 4 KB, and an offset 235 corresponding to lower 12 bits (bits 11-0) of the virtual address 221 addresses 1 byte in the page frame 226. The lower bits (bits 11-0) of the page table entry 228 correspond to attribute 232 of the page frame 226 addressed by the page address 231, for storing the present state. The attribute 232 contains an existence bit for indicating whether the page frame 226 addressed by the page address 231 is present on either the main memory 203, or the hard disk 204; an access bit for representing whether or not the page frame 226 has ever been accessed; and a change bit for indicating whether or not the page frame 226 has ever been written. It should be noted that only when the existence bit indicates whether or not the corresponding page frame 226 is present on the main memory 203, the page address 231 of this page table entry 228 is valid.

Figure 5:
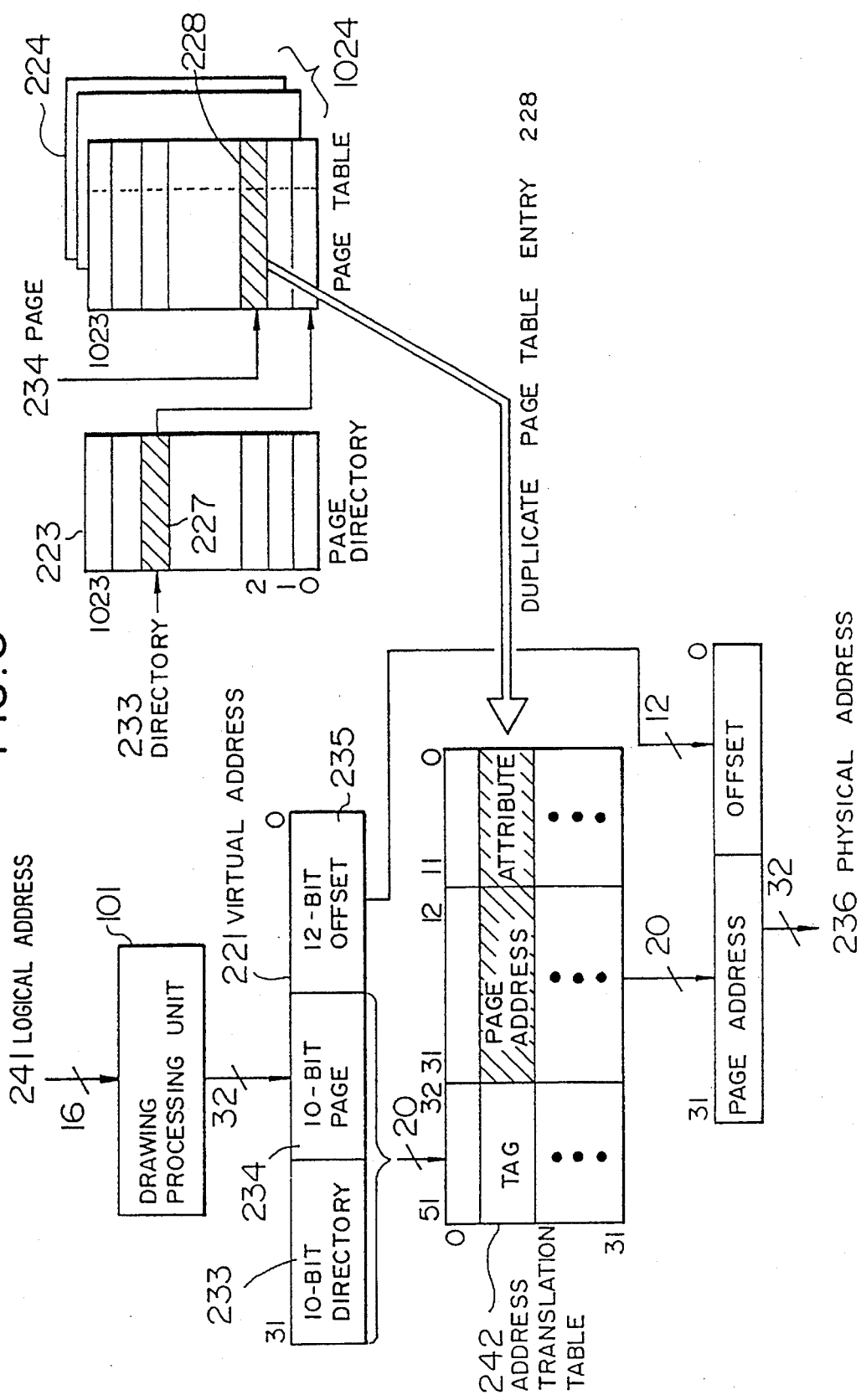
FIG. 5 is an illustration for representing a principle of an address translation mechanism employed in the graphic processor 100.

In FIG. 5, there is shown a principle of an address translation mechanism performed in the graphic processor 100. Both an X-coordinate value and a Y-cocordinate value are given by a 16-bit logic address 241 as a drawing command parameter to the drawing processing unit 101 of the graphic processor 100. In the drawing processing unit 101, a 32-bit virtual address 221 is calculated for every pixel data to be processed. The virtual address 221 is constructed of a low-bit directory 233, a 10-bit page 234, and a 12-bit offset 235. Among them, a check is made whether 20 bits of the directory 233 and page 234 are coincident with 32 pieces of 20-bits tags of the address translation table (TLB) 242 with the memory management unit 102. If there is an entry where the tag is coincident with 20 bits, 20 bits of the page address of this entry is summed with 12 bits of the offset of the virtual address 221, which becomes a 32-bit physical address 236. If there is no entry having a tag coincident with the upper 20 bits of the virtual address 221 in the address translation table 242, an entry in which the upper 20 bits of the virtual address 221 is used as a tag is newly formed. At this time, the corresponding page table entry 228 is read out with reference to the page directory 223 and page table 224 on the main memory 203 by employing the directory 233 by employing the directory 233 and page 234 of the virtual address 221, and is equal to a page address and attribute of an entry newly formed in the address translation table 242, so that it can be translated into the physical address 236.

An internal arrangement of each unit employed in the graphic processor 100 will now be described in detail.

INTERNAL ARRANGEMENT OF EACH UNIT

Figure 6:
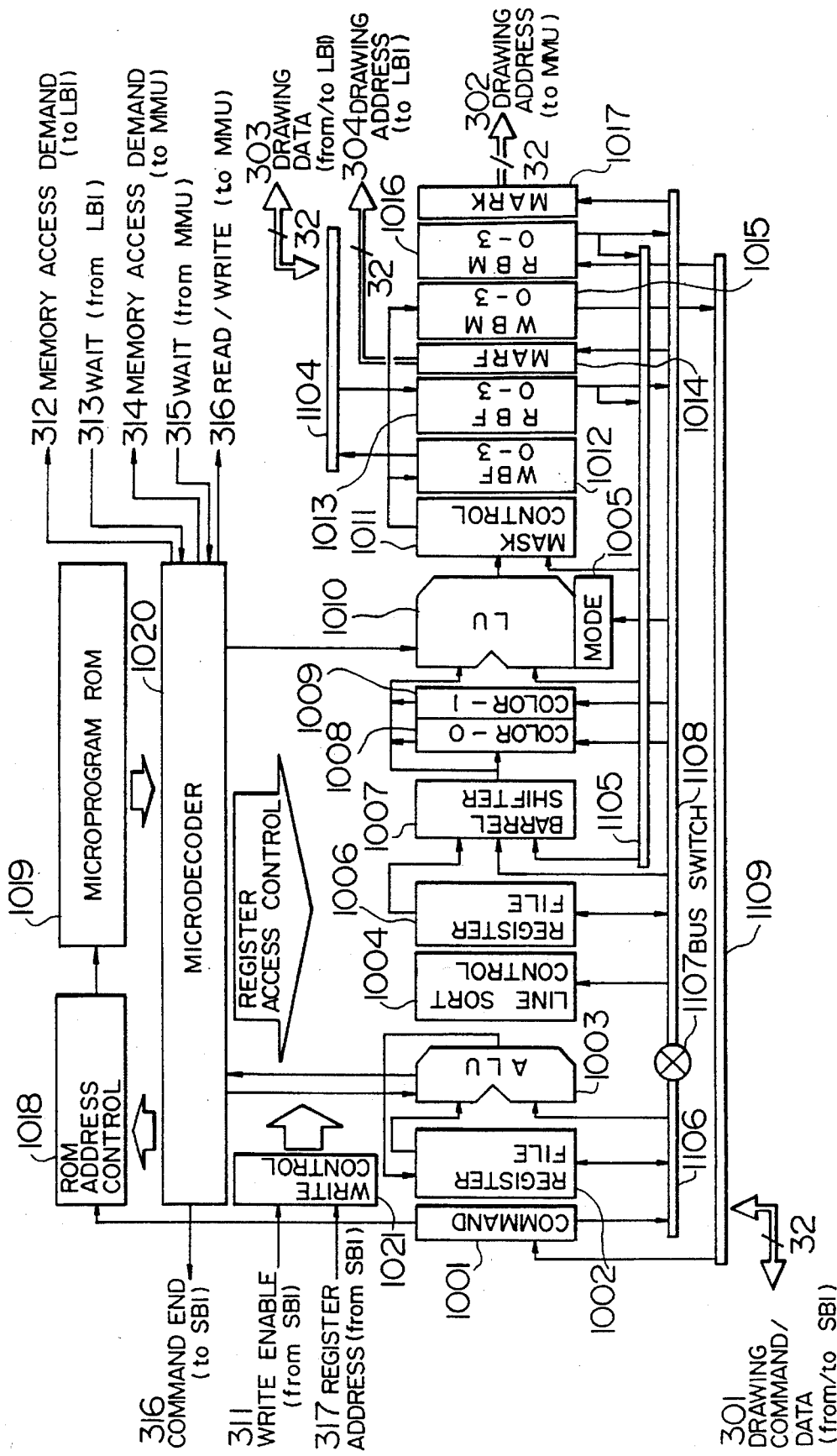
FIG. 6 represents an internal arrangement of a drawing processing unit 100.

FIG. 6 shows an internal arrangement of the drawing processing unit 101. A command to the drawing processing unit 101 is fetched into a command register 1001 via a drawing command having a 32-bit width/data bus 301 and a bus 1109 within the unit. The command fetching operation to the command register 1001 is controlled via signal lines 311 and 317 from the system bus interface 105 in response to a select signal generated by a write control circuit 1021. The drawing command which has been written into the command register 1001 via the drawing command/data bus 301 and bus 1109 within the unit, is transferred to a ROM address control 1018, whereby a microcode stored in a microprogram ROM 1019 and corresponding to the drawing command is read out. The read microcode is decoded by a microdecoder 1020 and in accordance with the decoded microcode, a register and calculators 1001 to 1007 employed in the drawing processing unit 101 and a bus switch 1107 are thereby controlled. A portion of an output from the microdecoder 1020 is returned to a ROM address control 1018 in order to control the subsequent reading of the microcode. Furthermore, the microdecoder 1020 requests the local bus interface 106 to access the frame buffer 205 via a signal line 312, or requests the system bus interface 105 to access the main memory 203 by way of signal lines 314 and 316. On the other hand, a pause or wait for the operation is requested by the local bus interface 106 via a signal line 313, or the memory management unit 102 via a signal line 315. This is required to accept that access time of the system bus interface 105 to the main memory 203 is varied by the processing sequence and also processing content of the external central processing unit 201, and furthermore the access time of the local bus interface 106 to the frame buffer 205 is changed by reading out the contents of the frame buffer 205 and into the CRT display unit 207, and also by refreshing the frame buffer 205 per se. If a pause or wait for the operation is requested from the local bus interface 106 or system bus interface 105, the microdecoder 1020 interrupts the overall operations of this drawing processing unit for a moment until this request is ended.

In connection with this drawing command, various parameters are transferred from the system bus interface 105 to the drawing processing unit 101. These parameters are stored into a register file 1102 via the drawing command/data bus 301, bus 1109 in the unit, command register 1001 and bus 1106 in the unit. The content of the register file 1102 is directly transferred to an arithmetic logic calculation unit 1003, or via a bus 1106 in the unit thereto. In accordance with the instruction of the microdecoder 1020, the arithmetic calculation is carried out in this arithmetic logic calculation unit 1003 and a calculation result is stored into the register file 1002. Also a carry and a comparison result detected during the arithmetic logic calculation are directly reported to the microdecoder 1020. Upon completion of processing a series of microcodes related to a single drawing command, the microdecoder 1020 reports an end of the drawing command execution to the system bus interface 105 via the signal line 316. Here, the arithmetic logic calculation circuit 1003 calculates an address and bit position and the like of the pixel data to be processed. If the pixel data to be processed is present in the main memory 203, the address information is transferred from the register file 1002 via a bus 1106 in the unit, a bus switch 1107, and a bus 1108 in the unit to an address register (MARK) 1017 for the main memory 203, and then via a drawing address bus 302 to a memory management unit 102. Then, based upon this address information, the pixel data to be processed, which has been transferred from the system bus interface 105, is sent via the drawing command/data bus 301 and a bus 1109 in the unit to a read buffer (RBM) 1016 for the main memory 203. The pixel data fetching operation by the read buffer 1016 for the main memory 203 is controlled by the signal lines 311 and 317 from the system bus interface 105 in response to a select signal generated by the write control circuit 1021. On the other hand, in case that the pixel data to be processed is present in the frame buffer 205, the address information obtained by the arithmetic logic calculation circuit 103 is transferred from the register file 1002 via a bus 1106 in the unit, a bus switch 1107, and a bus 1108 in the unit to a memory address register (MARF) 1014 for the frame buffer 205. Subsequently, based upon this address information, the pixel data to be processed, which has been sent from the local bus interface 106, is transferred via a drawing data bus 303 and a bus 1104 in the unit to a read buffer (RBF) 1013 for the frame buffer 205. The pixel data to be processed, which are stored in the read buffer (RBM) 1016 for the main memory 203 and the read buffer (RBM) 1013 for the frame buffer 205, are sent via buses 1105 and 1108 in the unit to a barrel shifter 1007, and also via the bus 1108 in the unit to a register file 1006. On the other hand, the pixel data which has been previously stored in the register file 1006 is sent to the barrel shifter 1007, and then this pixel data together with the data derived from the read buffer (RBM) 1016 for the main memory 203 and read buffer (RBM) 1013 for the frame buffer 205 are transferred by the barrel shifter 1007. The data processing result is data-translated in a color register 1008 and another color register 1009. Otherwise, the data processing result is directly sent to a logic calculation circuit (LU) 1010. This data together with the data derived from the read buffer (RBM) 1016 for the main memory 203 or the read buffer (RBF) 1013 for the frame buffer 205, are processed via the bus 1105 in the unit with a logic calculation circuit 1010 in accordance with the content of the calculation mode register 1005 and the instruction from the microdecoder 1020. The processing result is input into a mask control circuit 1011 in which, in response to the data derived from the read buffer (RBM) 1016 for the main memory 203 or read buffer (RBM) 1013 for the frame buffer 205, a selecting process in a unit of bit, for designating change bits by marking is performed to the processing result. The selecting process result is stored into a write buffer (WBM) 1015 for the main memory 203 in case that a storage destination corresponds to the main memory 203, and is also transferred via the bus 1109 in the unit and drawing command/data bus 301 to the system bus interface 105 in order that this selecting process result is written at an address which has been stored into a memory address register (MARM) 1017 for the main memory 203. If the processing result of the mask control circuit 1011 is stored in the frame buffer 205, this processing result is stored in a write buffer (WBF) 1012 for the frame buffer 205, and then is transferred to the local bus interface 106 via the bus 1104 in the unit and a drawing data bus 303 in order to be written into an address which has been stored into an address register (MARF) 1014 for a frame buffer 205. It should be noted that in case of a line drawing process, line sort information is transferred from a line sort control register 1004 to a logic calculation circuit 1010. The contents of the line sort control register 1004, calculation mode register 1005, color registers 1008 and 1009 are written from the system bus interface 105 via the drawing command/data bus 301, command register 1001, bus 1106 in the unit, bus switch 1107, and bus 1108 in the unit before the drawing command is performed. Similarly, a portion of the register file 1106 is written from the system bus interface 105. The bus switch is turned OFF when both LU and ALU independently perform a calculation process, respectively.

Figure 7:
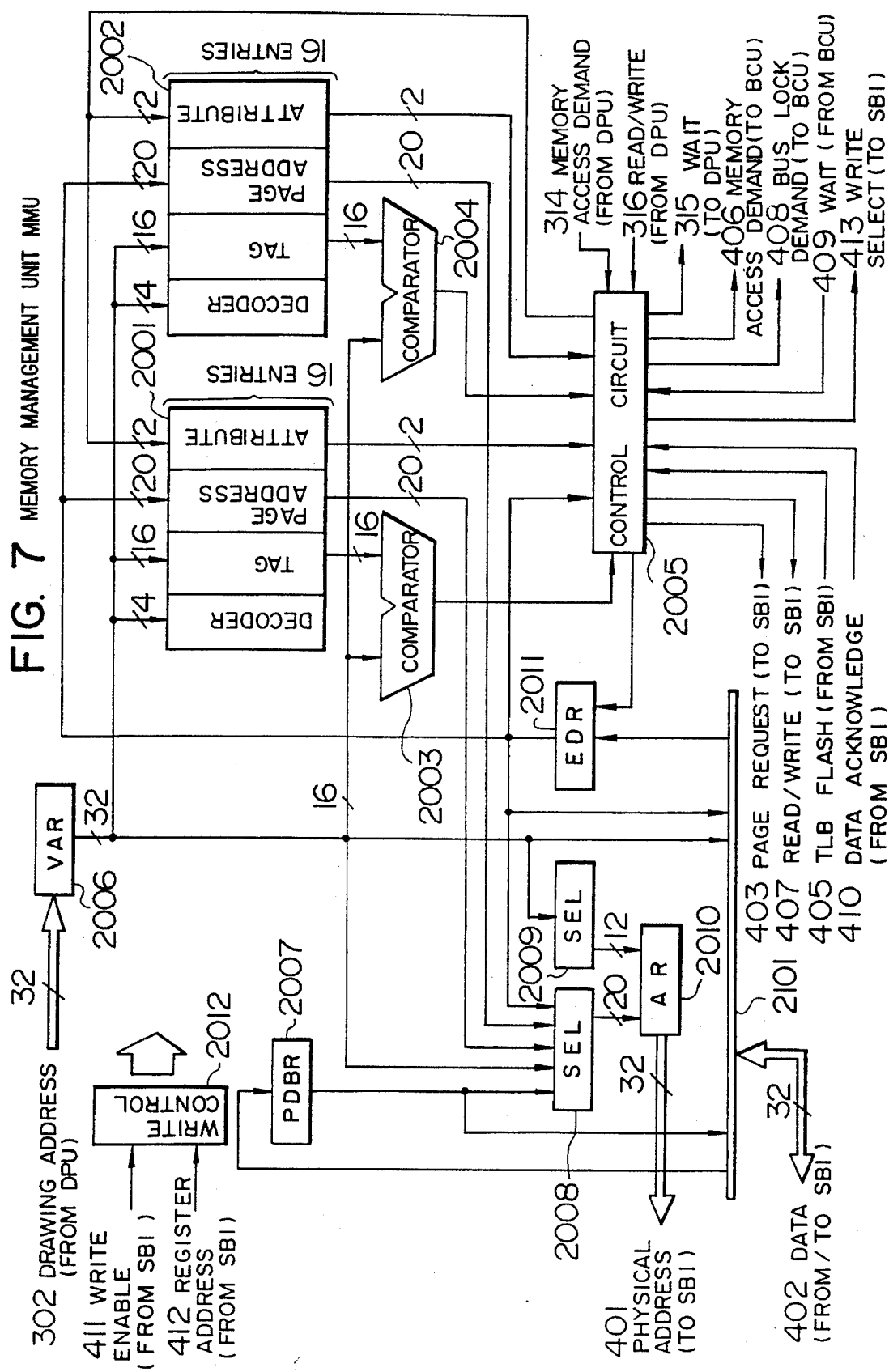
FIG. 7 indicates an internal arrangement of a memory management unit 102.

FIG. 7 represents an internal arrangement of the memory management unit 102. Upon receipt of an access demand from the drawing processing unit 101 to the main memory 203 via signal lines 314 and 316 (the signal line 316 indicates whether the memory access corresponds to the reading or writing operation) the memory management unit 102 fetches virtual address information of the main memory 203 into a virtual address register (VAR) 2006, which is transferred from the drawing processing unit 101 via a drawing address bus 302. 4 bit data (bits 15-12) among the content of the virtual address register 2006 are sent to decoder units of two address translation tables 2001 and 2002 which are provided so that the data transfer is carried out between the main memories in a two-way set associative scheme. The address translation tables 2001 and 2002 each own 16 sets of entries having a tag, page address, and attribute, and one of these entries is selected on the basis of the decoding result by the decoder unit. The 16-bit tag selected from the entries is compared with the uppermost 16 bits content (bits 31-16) of the virtual address register 2006. Comparison results obtained from the comparators 2003 and 2004 are sent to a control circuit 2005. On the other hand, the attribute (2 bits each) of the entries selected from the respective address translation tables 2001 and 2002 is also sent to the control circuit 2005. This attribute contains a valid/invalid bit indicating whether the entry is valid or invalid, and also an update bit representing whether the entry has been used for writing the data. These bits are 2 bits. In case that either comparison result of these comparators 2003 and 2004 is coincident, and further the entry selected by the coincident address translation table is valid, a 20-bit page address of this entry is selected by a selector (SEL) 2008, and thereafter stored into upper 20 bits (bits 31-12) of an address register (AR) 2010. At this time, the lower 12 bits (bits 11-0) of the virtual address register 2006 are selected by a selector (SEL) 2009 and thus stored into the lower 12 bits (bits 11-0) of an address register 2010. Subsequently, a 32-bit content of the address register 2010 is transferred as a physical address via a phsyical address bus 401 to the system bus interface 105. At this time, the control circuit 205 commands the bus control unit 103 to access the main memory 203 by employing a signal line 06, and also announces to the system bus interface 105 whether the access demand corresponds to the reading operation or writing operation by employing a signal line 407. Also, the control circuit 2005 announces to the system bus interface 105 by employing the signal line 413 that the data read out from the main memory 203 should be written into a read buffer (RBM) 1016 for the main memory 203 employed in the drawing processing unit 101. Until the bus control unit 103 acquires an access right to the system bus 211, or when the continuous use of the system bus 211 is interrupted by the pin SUS# from the graphic processor 100, the execution of the memory management unit 102 is temporarily stopped by a signal line 409 from the bus control unit 103. In conjunction with the temporal stop of the execution by the memory management unit 102, when the execution of the drawing processing unit 101 is required to be temporarily stopped, the control circuit 2005 temporarily stops the execution of the drawing processing unit 101. Furthermore, the control circuit 2005 sets an update bit for such cases wherein the memory access corresponds to the writing process and also the update bit of the attribute for the selected entry has not yet been set.

Even if both of the comparison results of the comparators 2003 and 2004 are coincident, or one of these comparison results is coincident, when this entry is invalid, the control circuit 2005 updates one entry of either the address translation table 2001 or 2002. An LRU (Least Recently used) algorithm is employed so as to update the entry. The control circuit 2005 contains therein 16-bit utility information, updates this utility information every time the entry is referred, and furthermore determines which address translation table 2001 or 2002 is updated. When the entry is updated, an upper 20-bit content of a page directory base register (PDBR) 2007 is selected by a selector 2008 and then stored at the upper 20 bits (bits 31-12) of the address register 2009. On the other hand, the upper 10-bit content (bits 31-32) of the virtual address register 2006 is written into 10 bits (bits 11-2) of the address register 2009, and "0" is written into the remaining 2-bit content (bits 1-0) of the address register 2009 by the selector 2009, whereas the address of the page directory entry 227 is set into the address register 2009. The content of the address register 2009 is transferred via the physical address bus 401 to the system bus interface 105. At this time, an announcement that the access operation corresponds to the reading operation is made to the system bus interface 105 by utilizing the signal line 407. By employing the signal line 413, the control circuit 2005 announces to the system bus interface 105 that the data read out from the main memory 203 must be written into an entry data register 2011 within the memory management unit 102. On the other hand, a read access demand to the main memory 203 is made via the signal line 406 to the bus control unit 103. The page directory entry 227 on the main memory 203 is written from the system bus interface 105 via the data bus 402 and a bus 2101 in the unit into an entry data register (EDR) 2011. This writing timing is given from the system bus interface 105 via the signal line 410 into the control circuit 2005. The control circuit 2005 checks an existence bit indicating whether the corresponding page table 224 is present on the main memory 203 or on the hard disk, which exists in the page directory entry 227 written into the entry data register 2011, and remands a roll-in (written into the main memory 203) of the corresponding page table 224 to the system bus interface 105 by employing the signal line 403. The completion of the page swapping is reported from the system bus interface 105 via the signal line 410. After the page swapping has been accomplished, the page directory entry 227 addressed by the address register 2009 is written into the entry data register 2011, and a check is again made to the existence bit within the entry data register 2011. When confirmation is made that the corresponding page table 224 is present on the main memory 203, the upper 20-bit (bits 31-12) content of the entry data register 2011 is selected by the selector 2008 and stored into the upper 20 bits (bits 31-12) of the address register 2009. On the other hand, 10 bits (bits 21-12) of the virtual address register 2006 are written into 10 bits (bits 11-2) of the address register 2009 by the selector 2009, and "0" is written into the remaining 2 bits (bits 1-0) of the address register 2009, and furthermore the address of the page table entry 228 is set into the address register 2009. The content of the address register 2009 is transferred via the physical address bus 401 to the system bus interface 105. At this time, such a fact that the access corresponds to the reading operation is reported via the signal line 407 to the system bus interface 105. On the other hand, a read access demand for the main memory 203 is established via the signal line 406 to the bus control unit 103. The page table entry 228 on the main memory 203 is fetched from the system bus interface 105 via the data bus 402 and bus 2101 in the unit to the entry data register 2011. This fetch timing is given from the system bus interface 105 via the signal line 410 to the control circuit 2005. The control circuit 2005 checks the existence bit indicating whether or not the corresponding page frame 226 is present on the main memory 203, contained in the page table entry 228 fetched into the entry data register 2011. If there is no corresponding page frame 226 on the main memory 203, then the control circuit 2005 demands a roll-in (fetched into the main memory) of the corresponding page frame 226 to the system bus interface 105 via the signal line 403. The completion of the page swapping is announced from the system bus interface 105 by the signal line 410. After the page swapping has been accomplished, the page table entry 228 addressed by the address register 2009 is fetched into the entry data register 2011, and a check is again made to the existence bit within the entry data register 2011. If confirmation is established that the corresponding page frame 226 is present on the main memory 203, with respect to one of the address translation tables 2001 and 2002 selected by the control circuit 2005, upper 16 bits (bits 31-16) of the virtual address register 2006 are written into the tag unit, and also upper 20 bits (bits 31-12) of the page entry register 2011 are written into the page address unit by 4 bits (bits 15-12) of the address register 2006. Further, a valid/invalid bit of the attribute unit of this entry is validated, and an update bit is set in accordance with the signal line 316 from the drawing processing unit 101. At this time, when it indicates that the write access is given to the signal line 316, after the update bit of the entry data register 2011 has been set, the content of the entry register 2011 is rewriten into the originally read page table 224. In other words, a command is made to both the bus control unit 103 and system bus interface 105 in such a manner that the content of the entry data register 2011 is written into the address designated by the address register 2009 via the signal lines 406 and 407. At this time, in order to guarantee that the content of the rewritten page table entry 228 is kept unchanged when this content is read out therefrom, a bus lock of the system bus 211 is commanded to the bus control unit 103 by employing the signal line 408. The completion of the writing operation is announced by the bus control unit 103 by way of the signal line 409. It should be noted that the base address of the page directory 223 is set into the page directory base register 2007 by the signal lines 411 and 412 for the system bus interface 105 via the data bus 402 and bus 2101 in the unit in response to the select signal generated by the write control circuit 2012 before the address translation is performed. Also, the writing controls to the entry register 2011 and virtual address register 2006 are executed by the signal lines 411 and 412 for the system bus interface 105 in response to the select signal generated by the write control circuit 2012.

Figure 8:
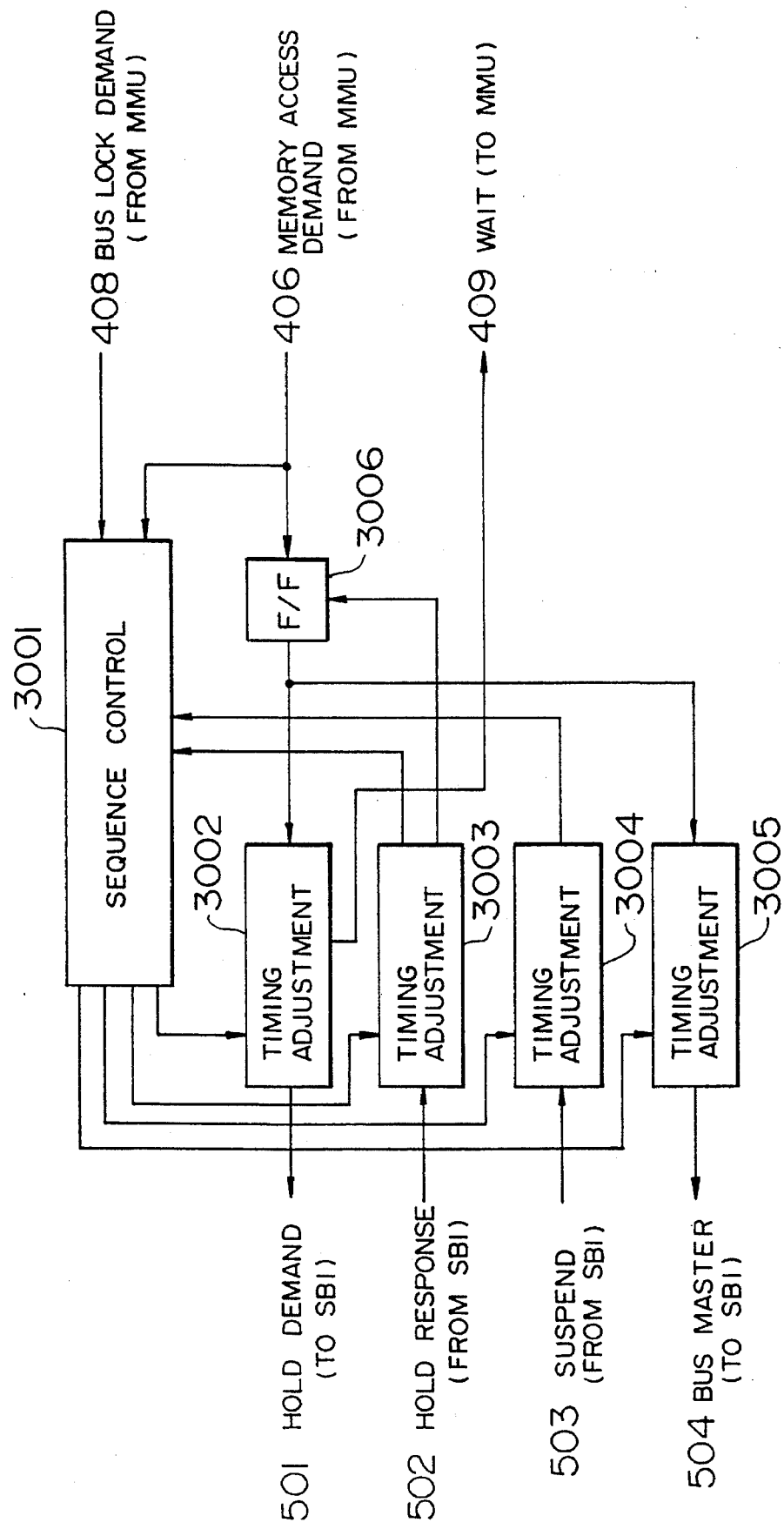
FIG. 8 is a schematic block daigram for representing an internal arrangement of a bus control unit 103.

In FIG. 8, there is shown an internal arrangement of the bus control unit 103. When an access demand to the main memory 203 is made from the memory management unit 102 via the signal line 409, the sequence control circuit 3001 within the bus control unit 103 instructs timing adjusting circuits 3002, 3003, 3004 and 3005 to obtain an access right to the system bus 211. First, the timing adjusting circuit 3002 instructs the memory management unit 102 to be temporarily stopped via a signal line. Thereafter, this timing adjusting circuit 3002 requests a bus arbitrator 202 externally provided with the graphic processor 100 to hold the system bus 211 via the system bus interface 105. Such a fact that the bus arbitrator 202 opens the system bus 211 to the graphic processor 100 is reported from the system bus interface 105 via a signal line 502 to the timing adjusting circuit 3003 within the bus control unit 103. At this time, the timing adjusting circuit 3003 commands the timing adjusting circuit 3002 via a flip-flop 3006 to release the pause operation of the memory management unit 102 through a signal line 409. On the other hand, when a release of the system bus 211 is demanded by outside of the graphic processor 100 while the system bus 211 is used, the sytem bus interface 105 reports to the timing adjusting circuit 3004 of the bus control unit 103 by employing a signal line 503. The timing adjusting Circuit 3004 reports it to the sequence control circuit 3001 which then commands the timing adjusting circuit 3002 that the memory management unit 102 should be temporarily stopped by employing the signal line 409. Under the control of the sequence control circuit 3001, the timing adjusting circuit 3005 announces the system bus interface 105 via a signal line 504 that the system bus 211 is under use as a bus master by graphic processor 100. In case that an occupying use of the system bus 211 has been demanded from the memory management unit 102 via a signal line 408, the occupation of the system bus 211 is instructed via a signal line 504 to the system bus interface.

Figure 9:
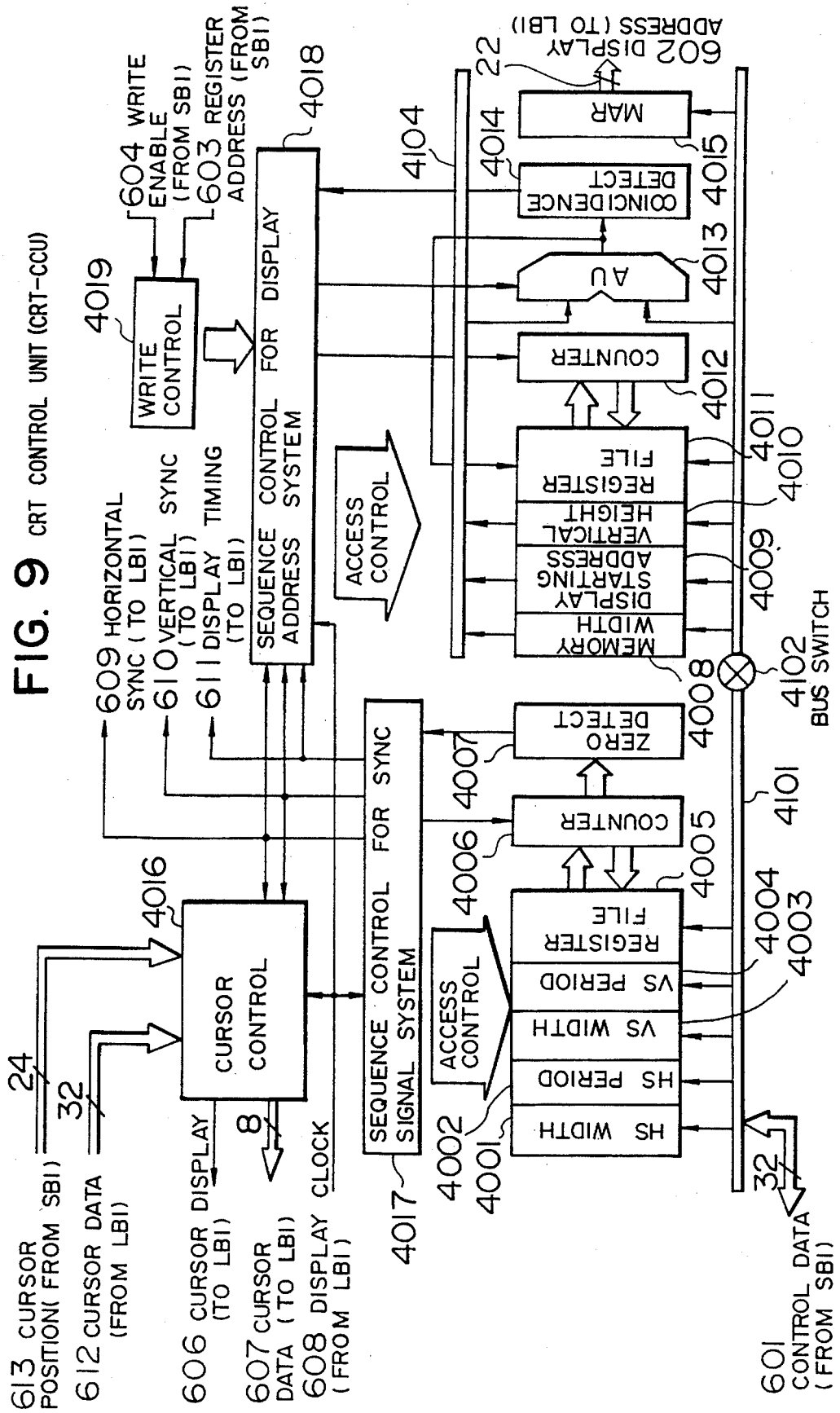
FIG. 9 represents an internal arrangement of a CRT control unit 104.

In FIG. 9, there is shown an internal arrangement of the CRT control unit 104. In response to a display clock (a signal line 608) derived from the local bus interface 106, a sequence circuit 4017 for a synchronization (sync) signal system controls registers and calculators numbered from 4001 to 4007 so as to produce a horizontal sync signal, vertical sync signal and a display timing signal, and further delivers these signals not only to a cursor control circuit 4016 as well as a sequence control circuit 4018 for a display address sytem, but also via signal lines 609, 610 and 611 to the local bus interface (LBI) 106. It should be noted that before the processes of the graphic processor 100 are executed, a pulse width of a horizontal sync signal, a horizontal scanning period, a pulse width of a vertical sync signal, and a vertical scanning period and the like are written from the system bus interface 105 via a control data bus 605 and a bus 4101 within the unit into the registers 4001 to 4005 by employing a select signal produced in a write control circuit 4019 through signal lines 603 and 604 from the system bus interface 105.

Also, in response to the display clock (the signal line 608) derived from the local bus interface 106, the sequence control circuit 4018 for the display address system produces a display address within a memory address register (MAR) while controlling registers and calculators numbered from 4008 up to 4015, and delivers the produced display address from the memory address register (MAR) via a display address bus 602 to the local bus interface 106. It should also be noted that prior to execution of the processes by the graphic processor 100, a horizontal width and vertical width of a frame buffer 205, and also a display starting address and the like are written into the registers 4008 to 4011 from the system bus interface 105 via a control data bus 605, a bus 4101 in the unit, a bus switch 4012 and another bus 4103 in the unit by utilizing a select signal which is generated in the write control circuit 4019 through the signal lines 603 and 604 from the system bus interface 105.

Moreover, cursor data which has been previously stored into a specific region of a frame buffer 205 is fetched from the local bus interface 106 via the cursor data bus 612 into a cursor control circuit 4016, and also cursor position information is supplied from the central processing unit 201 externally provided with the graphic processor 100 via the system bus interface 105 and a cursor position bus 613 to a cursor control circuit 4016. In addition thereto, the cursor control circuit 4016 generates cursor data the bit position of which has been shifted, cursor mask data, and a cursor display timing signal from both the horizontal sync signal and vertical sync signal produced from the sequence control circuit 4017 for the sync signals, and also the display clock (the signal line 608) derived from the local bus interface 106 in order to display an arbitrary position on the CRT display unit 207. Both the cursor data and cursor mask data are output via a cursor data bus 607 to the local bus interface 106, and the cursor display timing signal is output via the signal line 606 thereto.

It should be understood that both the system bus interface 105 and local bus interface 106 perform storage of control data, distribution to the respective units, and control of data transfer.

Flows of graphic processing operation will now be described with reference to drawings.

GRAPHIC PROCESSING FLOW

Figure 10:
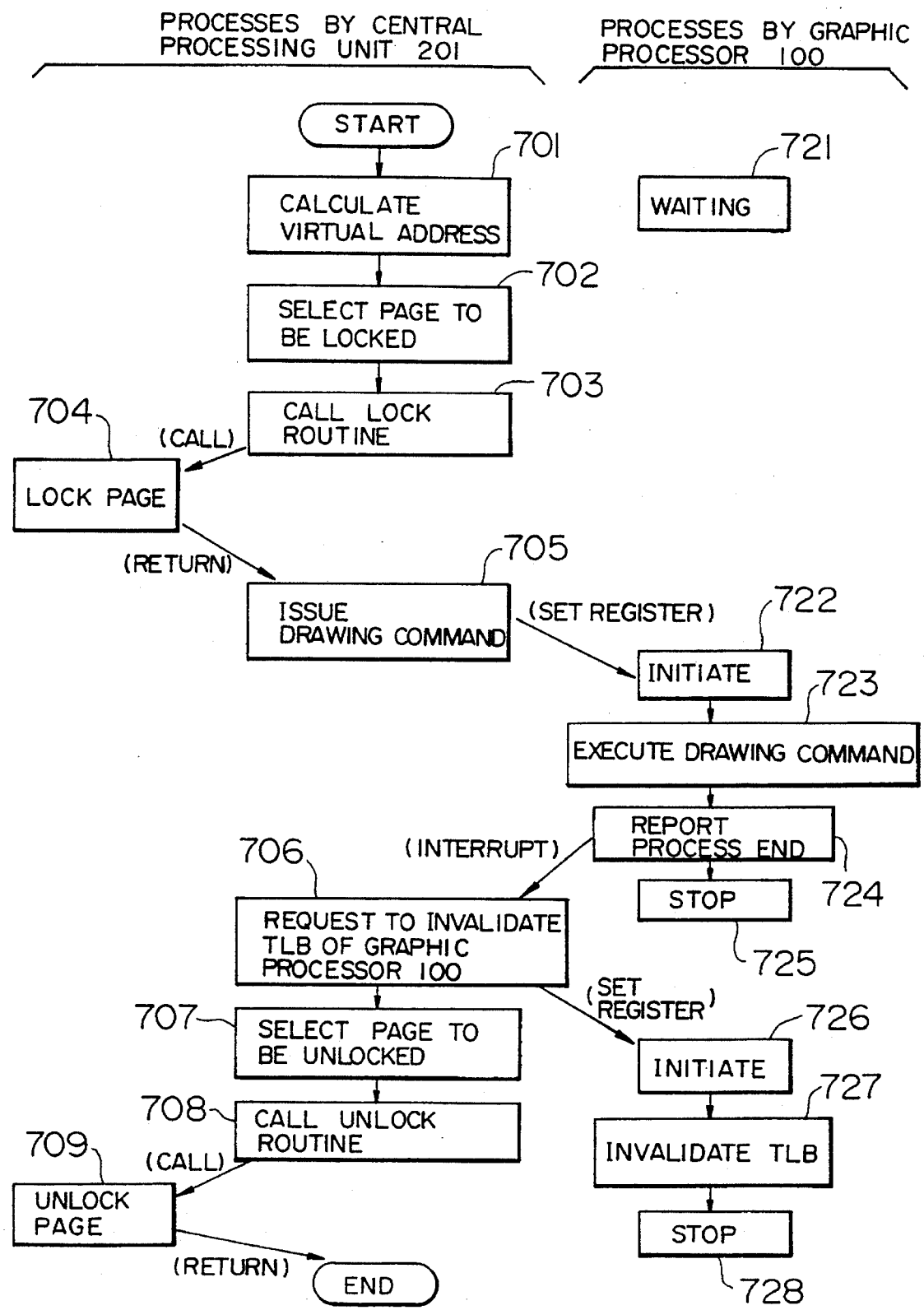
FIG. 10 is a flowchart for explaining a process flow of a drawing executed in the preferred embodiment of the present invention.

In FIG. 10, there is shown a flow of graphic processing operation performed in the main memory 203 or frame buffer 205 employed in the system shown in FIG. 1. First, the central processing unit 201 calculates a virtual address to be used for graphic, or drawing operation among the bit map data on the main memory 203 as a process of a graphic processing driver (701). Subsequently, the CPU 201 selects a page containing the bit map data in order that this bit map data is rolled out from the main memory 203 into the hard disk 204 during the graphic processing operation (702). Then, a page lock routine of the operating system is called (703). The operating system sets a bit of lock among the attribute information in order that the data stored in the main memory 203 is not swapped, performs the lock of the demanded page, and returns to the graphic processing driver a graphic or drawing command and transfers this command to the graphic processor 100, and thereafter sets a specific bit of a control register employed in the graphic processor 100 so as to initiate the graphic processor 100 (705). Until being initiated by the central processing unit 201, the graphic processor 100 is under waiting condition (721). When the graphic processor 100 is initiated (722), this processor 100 performs the drawing command which has been transferred at the processing step 705 (723). Upon completion of the drawing command execution, the graphic processor 201 reports this command execution completion to the central processing unit 201 by way of an interrupt process (724), and steps the operation (725). The central processing unit 201, which has requested by the interrupt process previously, commands that the address translation table (TLB) in the graphic processor 100 be invalidated by setting the specific bit of the control register employed in the graphic processor 100 (706). This register setting operation enables the graphic processor 100 to be again initiated (726), and the address translation table (TLB) within the graphic processor 100 is invalidated (727) and then the operation is stopped (728). After the process step 706, the central processing unit 201 selects the page which has been locked at the previous process step 702 (707) and calls an unlock routine of the operating system (708). After performing the unlock of the demanded page, the operating system transfers the control to the drawing processing driver, and a series of drawing or graphic processing operations are accomplished. With the above-described unlock operation, the center processing unit 201 is brought into such a state that data required for a new process operation (i.e., process succeeding to the process step 709) may be prepared in the main memory 203 by the swapping operation. Since the page table 224 (shown in FIG. 5) is updated by the central processing unit 201 if the swapping operation is carried out, the address translation table (TLB) 242 employed in the graphic processor 100 and also corresponding to a duplication of this table has no meaning, and necessary invalidation of the address translation table (TLB) 242 is previously performed when an occurrence of a swapping operation can be recognized prior to updating the page table.

Figure 11:
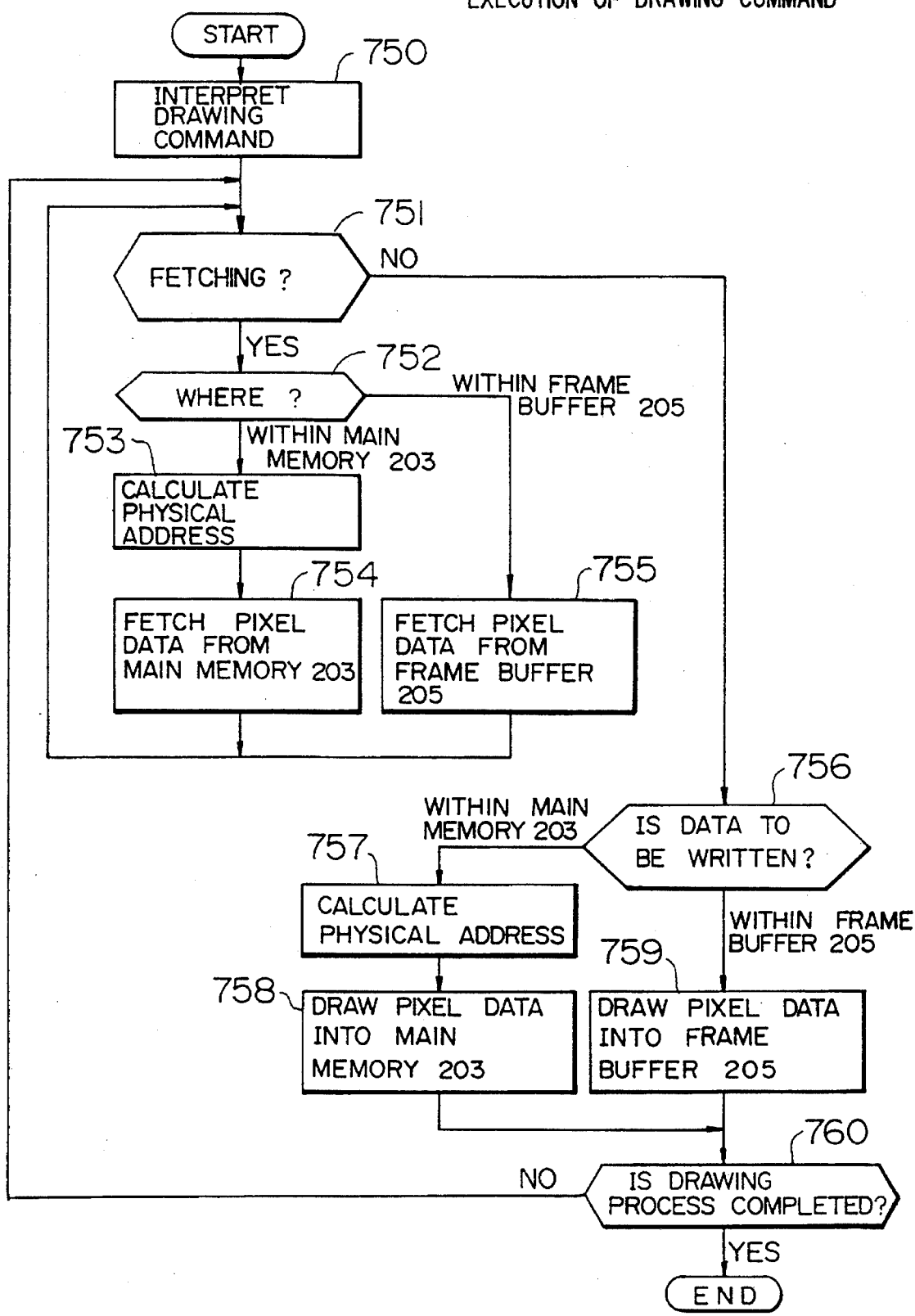
FIG. 11 is a flowchart for explaining an execution flow of a drawing (plotting) command employed in the graphic processor 100.

FIG. 11 is a flowchart of the process step 723 shown in FIG. 10. The graphic processor 100 first interprets the drawing command transferred from the central processing unit 201 (705), and performs the drawing, or graphic processing operation in a unit of 32 bits (751 to 759). During the drawing processing operation in a unit of 32 bits, a check is made whether or not pixel data to be fetched is present (751). If there exists the pixel data to be fetched, confirmation is made of this existence (752). If the fetched data is present in the main memory 203, a physical address is calculated (753), the pixel data is fetched from the main memory 203 (754), and thereafter the processing operation is returned to a process step 751. If confirmation is made that the fetched data exists in the frame buffer 205, then the pixel data is fetched from the frame buffer 205 with keeping a logic address thereof (755), and the processing operation is returned to a process step 751. If confirmation is made that there is no data to be fetched at the process step 751 with respect to the 32-bit data to be drawn, a check is performed as to whether a data writing place corresponds to the main memory 203 or frame buffer 205 (756). If the data is to be written into the main memory 203, after the physical address has been calculated (757), the 32-bit data is written into the main memory 203. On the other hand, when the 32-bit data is to be written into the frame buffer 205, the data writing operation to the frame buffer 205 is completed with employment of the logic address (759). After the writing operation is ended, a check is done as to whether or not the execution of the drawing command has been accomplished. If this execution has not yet been completed, the processing operation is returned to the previous process step 751 for executing a further 32-bit data drawing (760).

Figure 12:
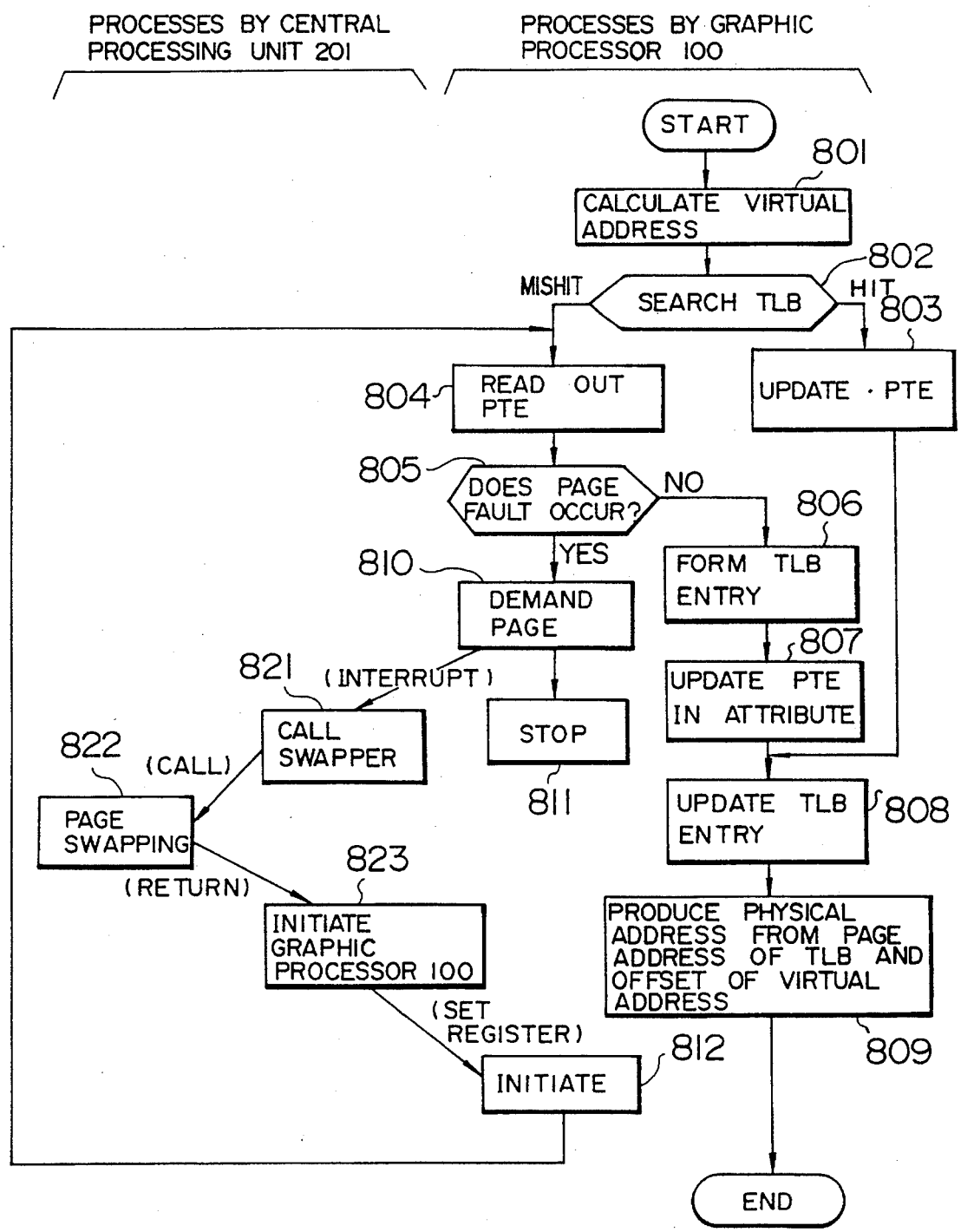
FIG. 12 is a flowchart for explaining a calculation flow of a physical address employed in the graphic processor 100.

In FIG. 12, there is shown a flow of the process steps 753 and 757. A virtual address must be first calculated (801) before calculating a physical address. Subsequently, an address translation table (TLB) is searched by employing this virtual address so as to check whether or not there exists and entry required for the address translation (802). If there is the entry in the address translation table (TLB) (in case of TLB hit), and a page table entry within the page table in the main memory 203 must be updated (in case that an updated bit of the corresponding entry of the translation table (TLB) in the graphic processor 100 and being the writing process to the main memory 203 has not yet been set), the gaphic processor 100 per se accesses the main memory 203 in order to set the updated bit within the corresponding page table entry PTE (803). After setting also the updated bit of the entry corresponding to the translation table TLB (808), a physical address is produced (809) and the processing operation is ended.

When the address translation table is mistakenly hit at the previous process step 802, the graphic processor 100 accesses the main memory 203 to read out the page table entry (PTE) (804). Here, a page fault is detected when there is no corresponding page table in the main memory 203, although otherwise the corresponding page table is present in the main memory 203, a page to be accessed is not present in the main memory 203 (805). When the page fault is not detected, an entry is newly formed in the translation table (TLB) within the graphic processor 100 (806). Then, if the page table entry (PTE) is required to be changed (corresponding to the writing operation to the main memory 203, in case that the updated bit of the corresponding entry of the translation table in the graphic processor 100 has not yet been set), the graphic processor 100 per se accesses the main memory 203 in order to set the updated bit within the corresponding page table entry (807). After the updated bit of the corresponding entry within the translation table is set (808), the physical address is generated (809) and the process operation is completed.

At the process step 805, when the page fault is detected, a roll-in of page is commanded to the central processing unit 201 by the interrupt process (810) and the operation is ceased (811). The central processing unit 201 which has received the interrupt demand, calls the swapper of the operating system (821) and executes the swapping (822). After the page swapping operation has been accomplished, the graphic processor 100 is again initiated by setting a specific register (823). The graphic process by the initiated graphic processor 100 is returned to the process step 804.

Figure 13:
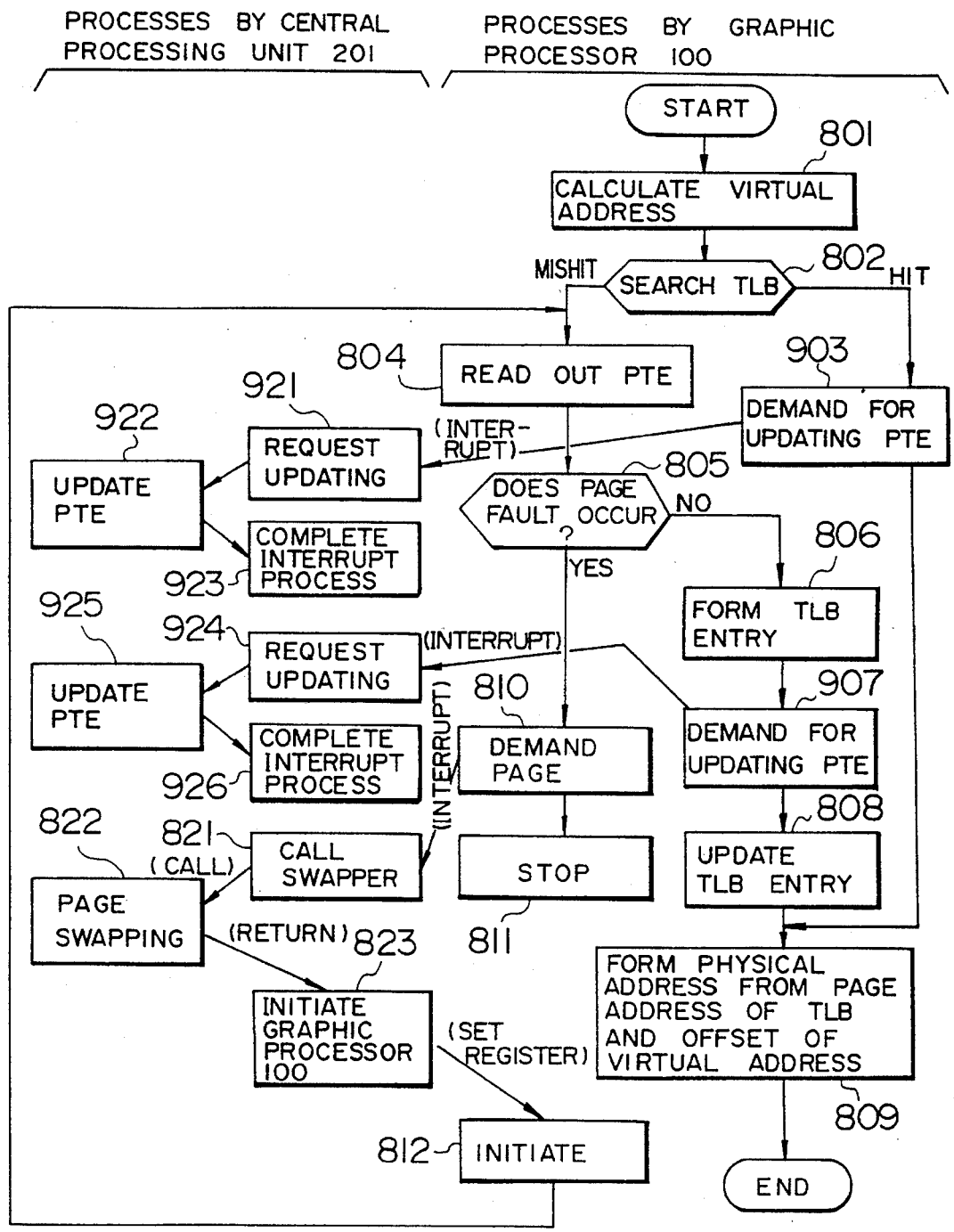
FIG. 13 is a flowchart for explaining a calculation flow of another physical address different from the physical address of FIG. 12, employed in the graphic processor 100.

FIG. 13 represents another method for requesting the central processing unit 201 to perform the process operations of the steps 803 and 807 shown in the process flow of FIG. 12, instead of the self execution. In case that the address translation table is hit at the process step 802, the graphic processor 100 commands the central processing unit 201 to update the page table entry PTE in the page table in the main memory 203 (903). The central processing unit 201 updates the page table entry in response to the updating demand, and thereafter completes the interrupt process (923). At a processing step 907, the graphic processor 100 similarly commands the central processing unit 201 to update the page table entry PTE of the main memory 203 (907). After the central processing unit 201 has updated the page entry (924-925), the interrupt process is ended (926).

In the system for supporting the virtual storage, according to the above-described preferred embodiment, since the graphic processor 100 per se can translate the virtual address into the physical address, even when the bit map to be processed on the main memory 203 exists over plural pages, the central processing unit 201 forms the drawing commands every page and no longer requires instruction of the drawing processing operation by the graphic processor 100. Consequently, there is a particular advantage that the communication overheads from the central processing unit 201 to the graphic processor 100 with respect to the drawing command can be reduced.

Also in case that the central processing unit 201 tries to use the system bus 211 due to the urgent processing operation while occupying the system bus 211 by the graphic processor 100, this bus use may be realized by setting the bus hold acknowledge (HLDA) pin to a "Low" level. However, to realize this operation, there is such a drawback that the arrangement of the bus arbitrator 202 becomes complex. Nevertheless, since the suspend (SUS#) pin is newly employed in the graphic processor 100, there is another particular merit that the use of the system bus 211 by the graphic processor 100 may be easily interrupted without requesting the bus arbitrator 202.

Figure 14:
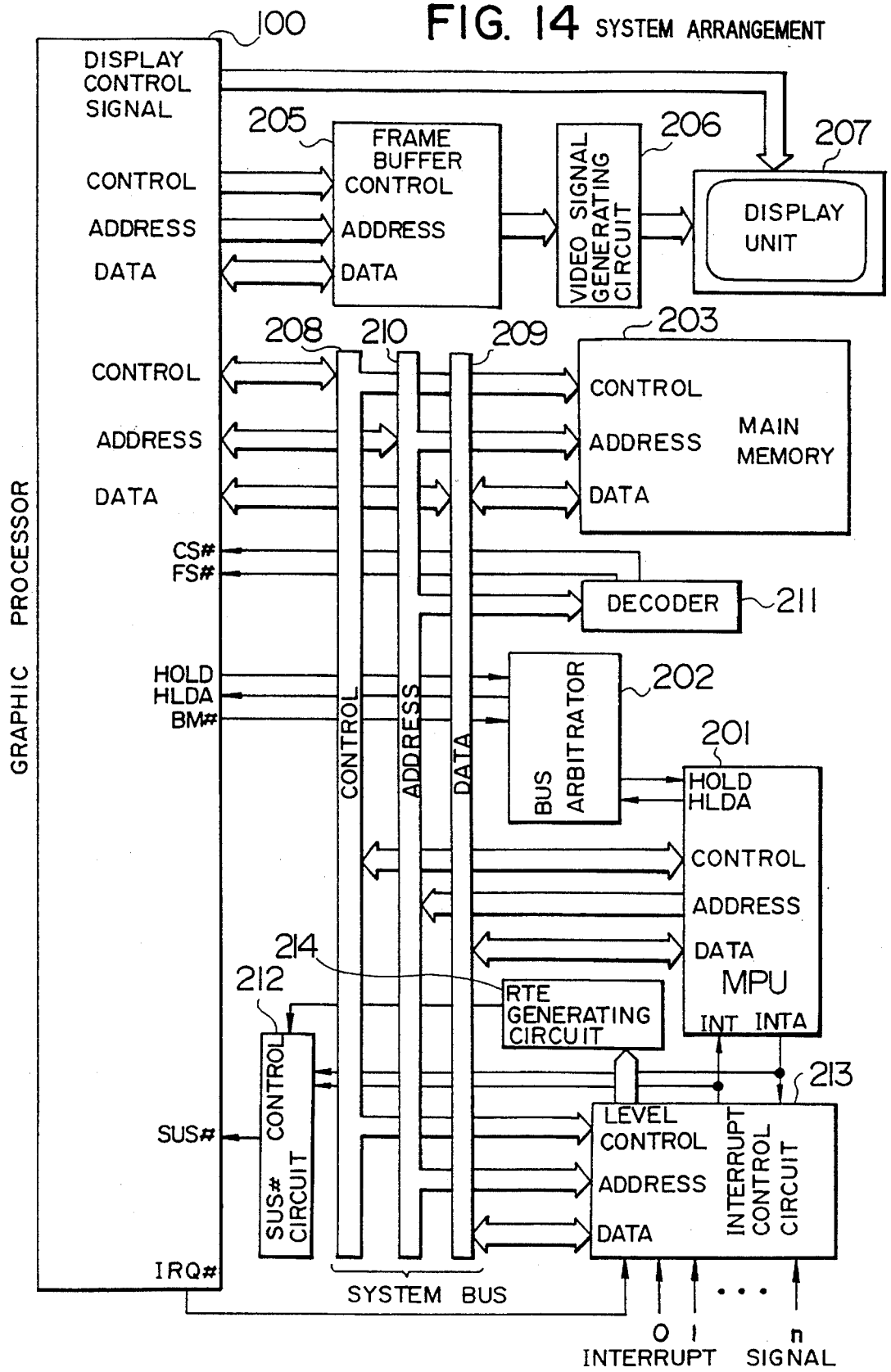
FIG. 14 is a schematic block diagram of a system arrangement of a data processing system according to another preferred embodiment of the present invention.

FIG. 14 represents an arrangement of a system according to another preferred embodiment of the present invention. Both a central processing unit (referred also to an "MPU") 201 and a graphic processor 100 are connected to a main memory 203 via a system bus constructed of a control bus 208. A bus arbitrator 202 arbitrates whether the central processing unit 201 or graphic processor 100 accesses the main memory. A frame buffer 205 is such a memory to store display data to be displayed on a display unit 207. A video signal generating circuit 206 controls the data stored in the frame buffer 207 so as to be displayed on the display unit 207. The graphic processor 100 performs data transfer between the frame buffer 205 and main memory 203, data transfer within the frame buffer 205, and data transfer within a main memory 300. A decoder 211 generates an LSI selecting signal by which the MPU accesses an internal register and the frame buffer 205 of the graphic processor 100. A suspend (SUS) control circuit 212 detects an interrupt signal supplied to the MPU to thereby produce a signal for interrupting a use of the system bus by the graphic processor 100. An interrupt control circuit 213 is such a circuit for controlling a priority sequence by which other input/output devices (not shown) produce interruption to the MPU. A RETURN FROM EXCEPTION (PTE) generating circuit 214 detects that the MPU 201 has completed the interrupt process, and restarts the use of the system bus by the graphic processor 100.

It is assumed that the graphic processor 100 is manufactured as an LSI (Large-Scale Integration) in this preferred embodiment.

SYSTEM BUS ACCESS BY GRAPHIC PROCESSOR 100

The graphic processor 100 utilizes the system bus in order to transfer data between the main memory 203 and frame buffer 205. First, this process will now be described with reference to FIGS. 14 and 15. Since the system bus is normally used by the MPU 201, the graphic processor 100 outputs a bus request signal (HOLD) to the bus arbitrator so as to obtain bus priority. Once this HOLD signal is asserted, the bus arbitrator 202 commands the MPU 201 to release or open the system bus. The MPU 201 releases the bus when the memory accessing operation under execution is completed, and announces to the bus arbitrator that the bus has been released. The bus arbitrator 202 announces to the graphic processor 100 by employing an HLDA signal that the system bus has been released. When the graphic processor 100 recognizes that the system bus has been released upon receipt of the HLDA signal, the graphic processor 100 commences an accessing operation to the main memory 203 and asserts a bus master BM# signal indicating that the system bus is in use. Upon completion of the memory access, the graphic processor negates the HOLD signal and returns the priority of the system bus to the MPU 201.

Figure 15:
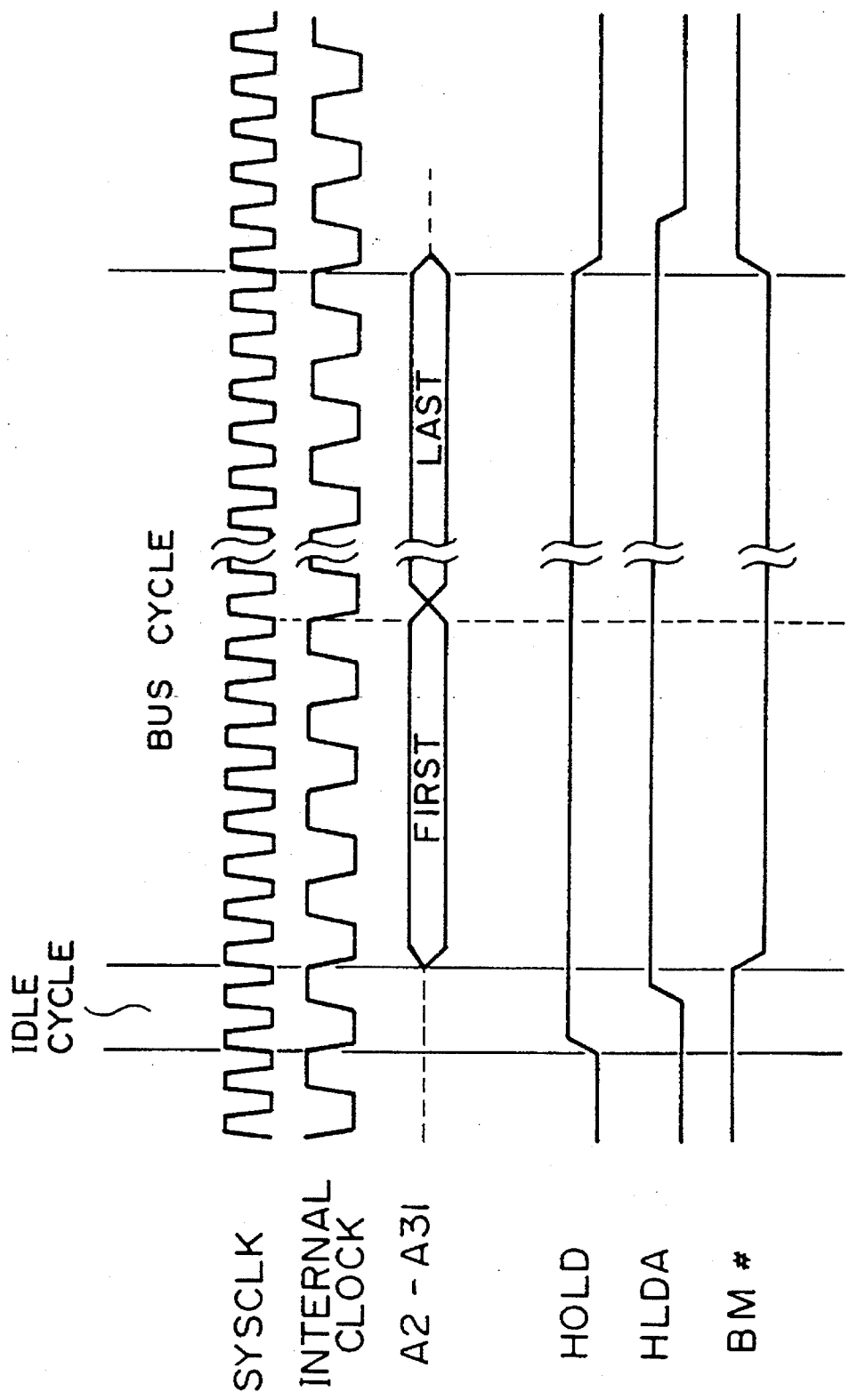
FIG. 15 represents an arbitration timing when accessing a system bus of the graphic processor 100.

A problem occurring in the processing operation shown in FIG. 15 is such that a control of bus arbitration between the graphic processor 100 and MPU 201 must be performed at a higher efficiency in order to improve the processing speed. Since the MPU 201 is required to perform any urgent processing operations, lengthy use of the system bus with employment of the conventional burst mode cannot be realized in the graphic processor 100. Then, if the MPU 201 and graphic processor 100 are switched every time one memory accessing operation is carried out, the time required for the arbitration is prolonged which may cause the performance of the system to be lowered. In general, the urgent processing operation by the MPU 201 is initialized by interrupt operation. Therefore, in accordance with this preferred embodiment, the graphic processor 100 can continuously use the system bus for a long time by way of such a novel method (will be discussed later) that when an interrupt signal to the MPU 201 is produced, the use of the system bus by the graphic processor 100 is interrupted.

Figure 16:
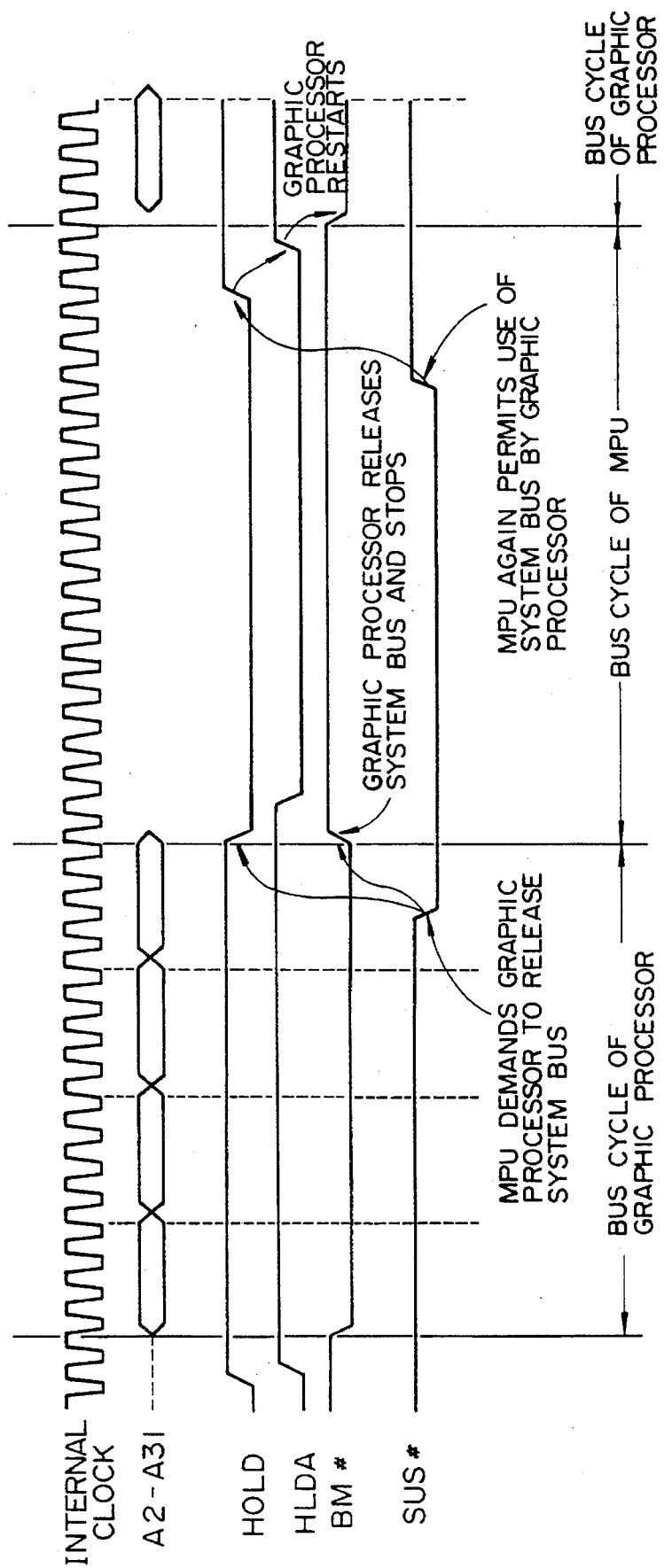
FIG. 16 represents a timing at which the system bus is temporarily released to MPU by employing an SUS# terminal of the graphic processor 100.

FIG. 16 is a time chart for representing an operation to assert the SUS# signal with respect to the graphic processor 100 when an interrupt operation is performed for the MPU 201. When the SUS# signal is asserted, the graphic processor 100 opens or releases the system bus, and negates both the HOLD signal and also BM# signal. Thereafter, the MPU 201 can utilize the system bus. After the MPU 201 has completed the urgent processing operation, the SUS# control circuit 212 negates the SUS# signal, so that the graphic processor 100 can restart a further process.

Figure 17:
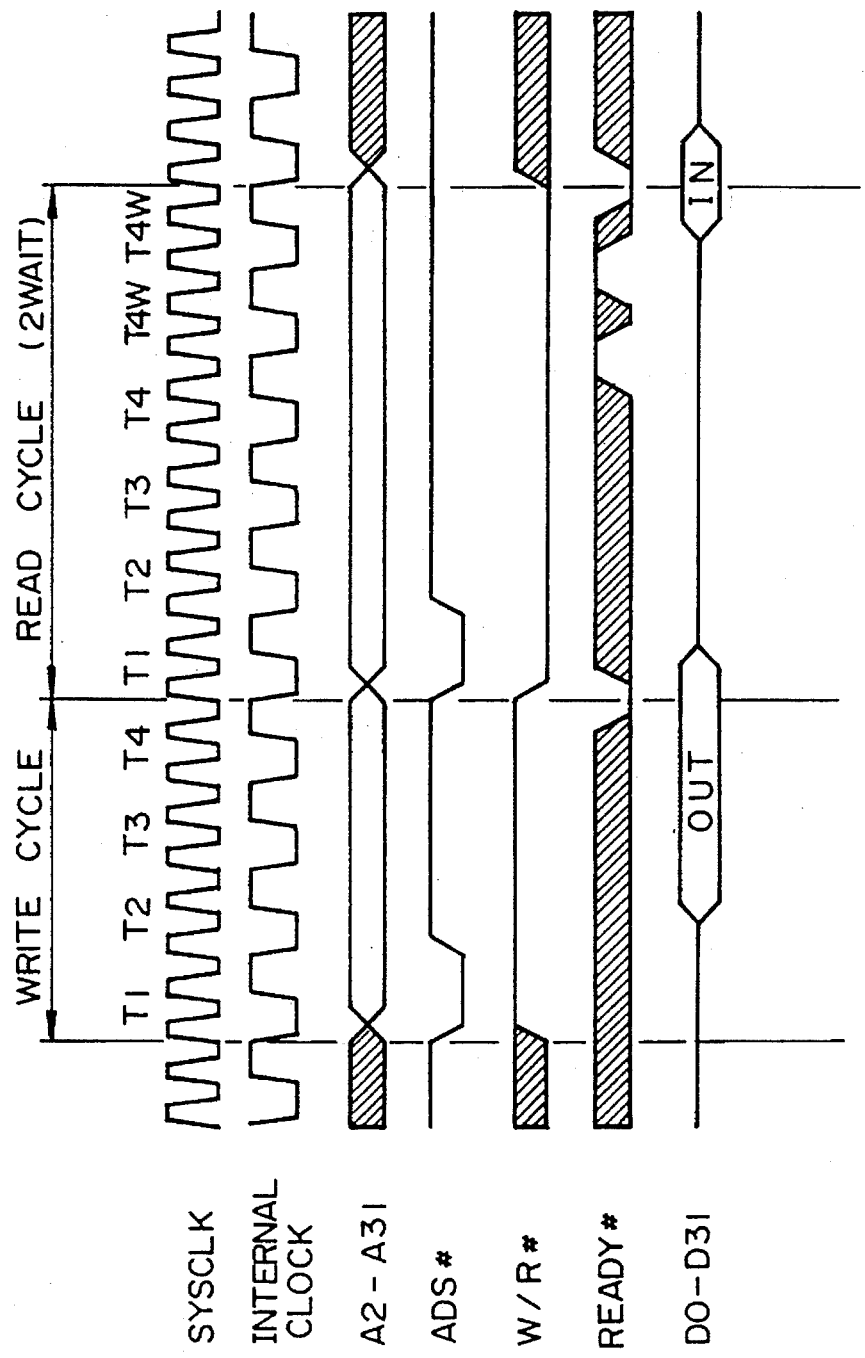
FIG. 17 illustrates a memory cycle when the graphic processor 100 accesses a main memory.

FIG. 17 is a time chart when the graphic processor 100 accesses the main memory. Assuming now that the one cycle of an internal operation clock corresponds to 1 state, both a read operation and a write operation are performed as a basis of 4 states. A write cycle is represented under condition that a W/R# signal becomes a high level. A read cycle is indicated under condition that the W/R# signal is set to a low level. If a READY# signal becomes a high level when the read or write cycle is ended, this cycle is extended. In FIG. 17, since the READY# signal becomes a high level at the fourth state of the read cycle and also the succeeding state, it is represented that a wait cycle having two states is inserted.

Then, a control method for the above-described SUS# signal will now be described.

Figure 18:
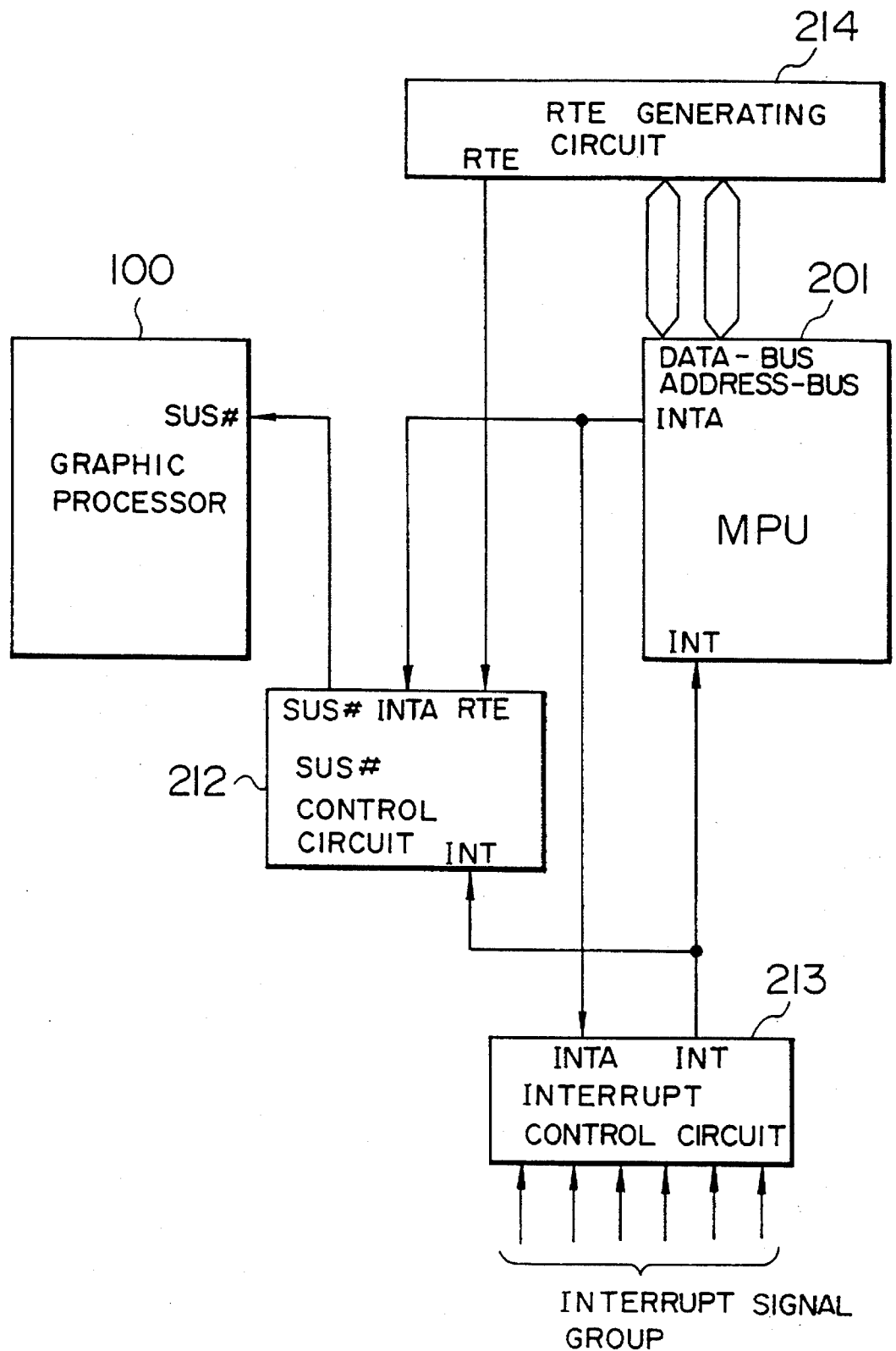
FIG. 18 is a schematic diagram for representing a hardware construction for controlling the SUS# signal by utilizing software.

FIG. 18 indicates a hardware arrangement required for controlling the SUS# signal. There are provided an SUS# control circuit 212, an interrupt control circuit 213, and a RETURN FROM EXCEPTION (PTE) generating circuit 214 other than the graphic processor 100 and MPU 201. After an interrupt signal group derived from other devices (not shown) has been priority-processed, the interrupt control circuit 213 requests the MPU 201 for an interrupt operation by way of an INT signal. On the other hand, the MPU 210 returns a response signal to the above-described interrupt signal as an INTA signal with respect to the interrupt control circuit 213. In response to the above-described INT signal and INTA signal, the SUS# control circuit 212 asserts the SUS# signal. When the interrupts process by the MPU 201 has been accomplished, the RTE generating circuit 214 announces the SUS# control circuit 212 by employing the RTE signal which is asserted by decoding predetermined codes appearing on the address bus and also data bus. The SUS# control circuit 212 negates the SUS# signal by the above RTE signal.

Figure 19:
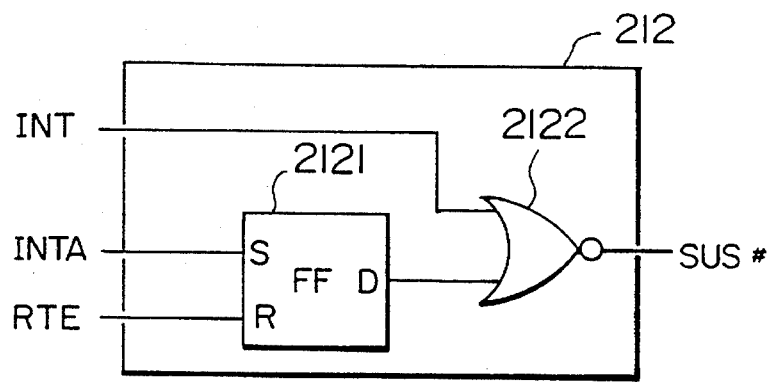
FIG. 19 represents a logic structure of an SUS# control circuit 212.
Figure 20:
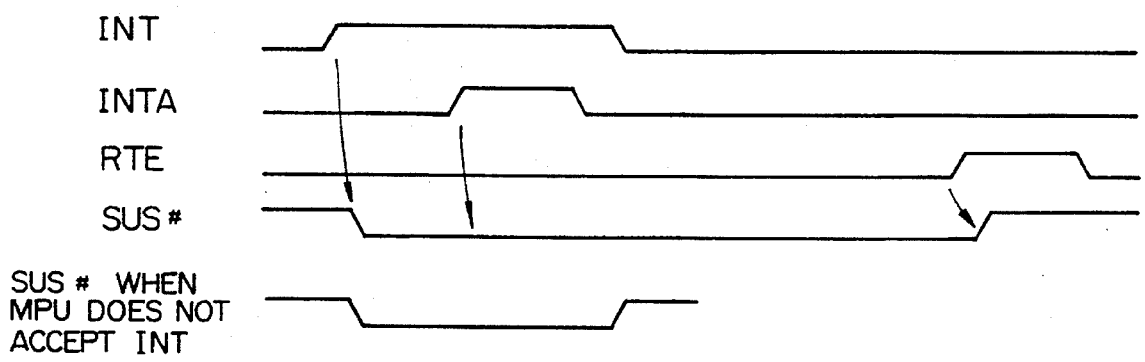
FIG. 20 is a timing chart of the SUS# control circuit 212.
Figure 21:
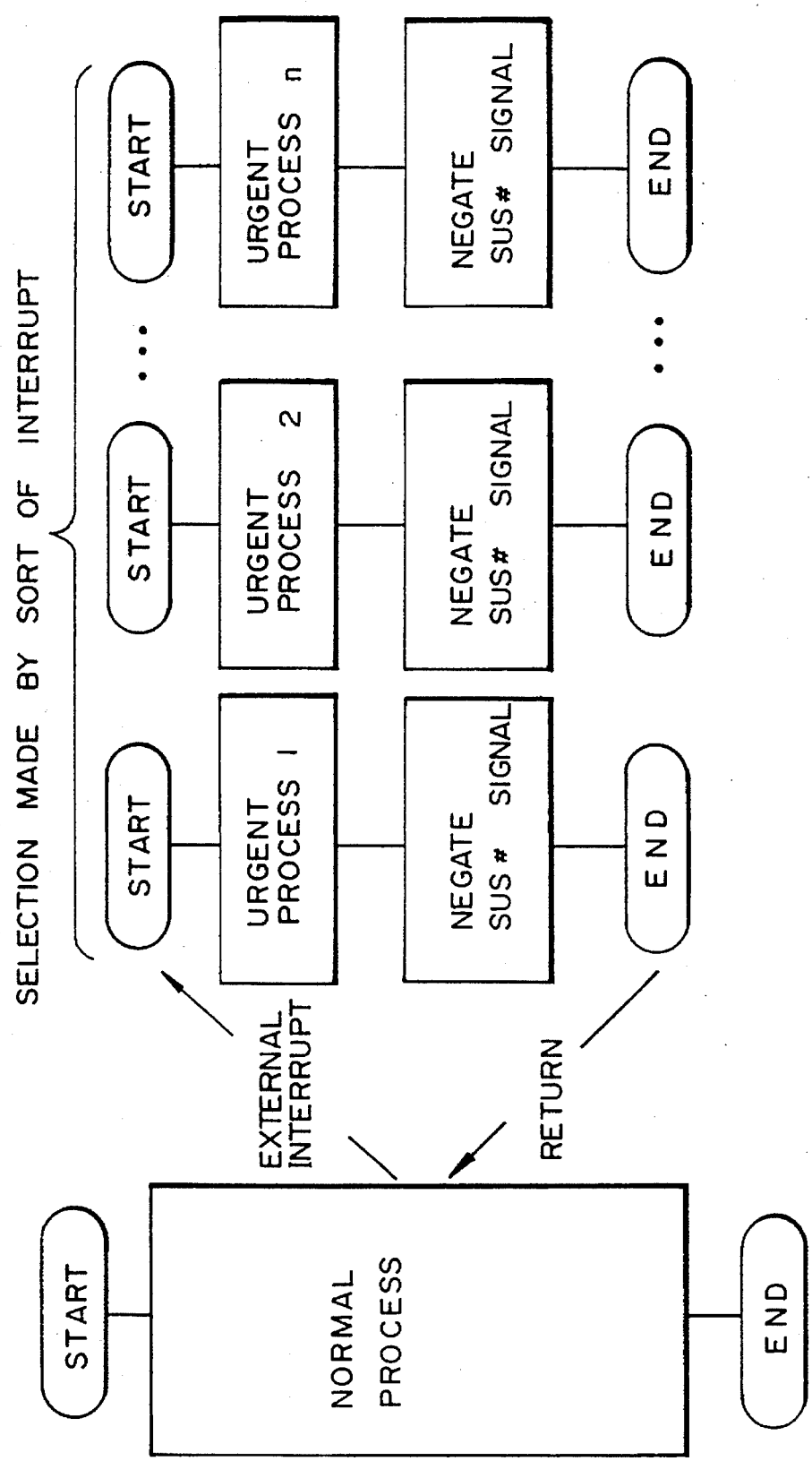
FIG. 21 is a flowchart for explaining a process flow of an MPU 201 corresponding to FIG. 18.

FIG. 19 is a logic diagram of the SUS# signal control circuit 212. This signal control circuit 212 is constructed of a flip-flop 2121 which is set by the INTA signal and also reset by the RTE signal, and an OR gate 2122 for OR-gating an output signal of the flip-flop 2121 and the INT signal. In accordance with the circuit arrangement shown in FIG. 19, as the SUS# signal is first generated by the INT signal, the MPU 201 can quickly perform the interrupt processing operation. There are some possibilities that the INT signal is immediately negated due to a certain reason that the devices (not shown) before the MPU 201 produce the INTA signal after being asserted. That is to say, even if the INT signal is generated, there are some cases that the MPU 201 does not perform the interrupt processing operation. The SUS# signal is negated when the INT signal is accomplished. Therefore, the flip-flop 2121 is set when the MPU 201 asserts the INTA signal and confirmation can be established that the interrupt process is firmly performed. In FIG. 20, there is shown a time chart of FIG. 19. FIG. 21 is a flowchart for representing process contents of the MPU 201. When the MPU 201 performs the normal process and an interrupt is caused by the INT signal, the above-described normal process is interrupted and a process required for this interrupt is carried out by the MPU 201. After performing the process required for the interrupt, for negating the SUS# signal by employing the RTE generating circuit shown in FIG. 18, the normal process is restarted.

Figure 22:
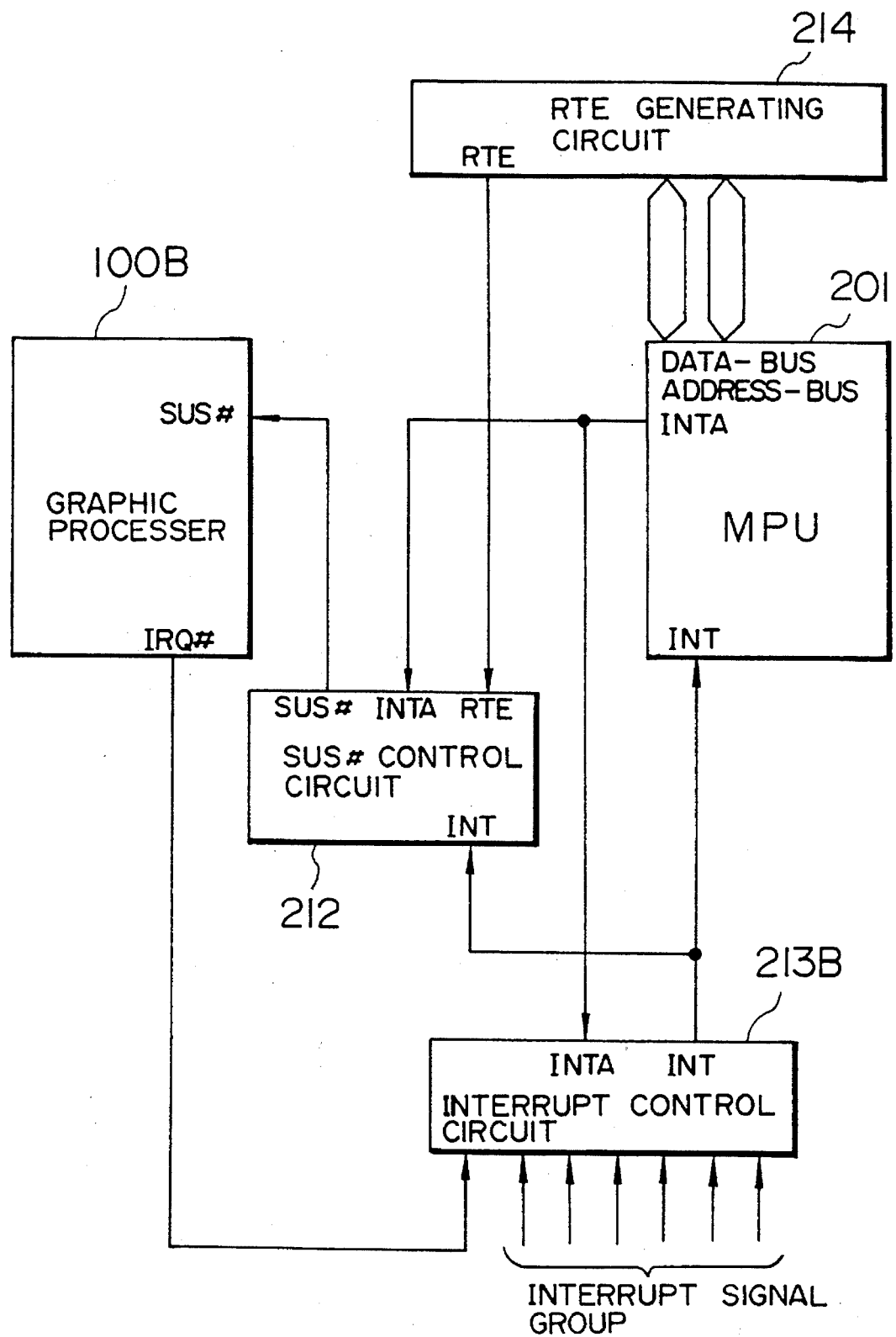
FIG. 22 is a schematic block diagram of a system arrangement for mitigate modifications of the SUS# control software.
Figure 23:
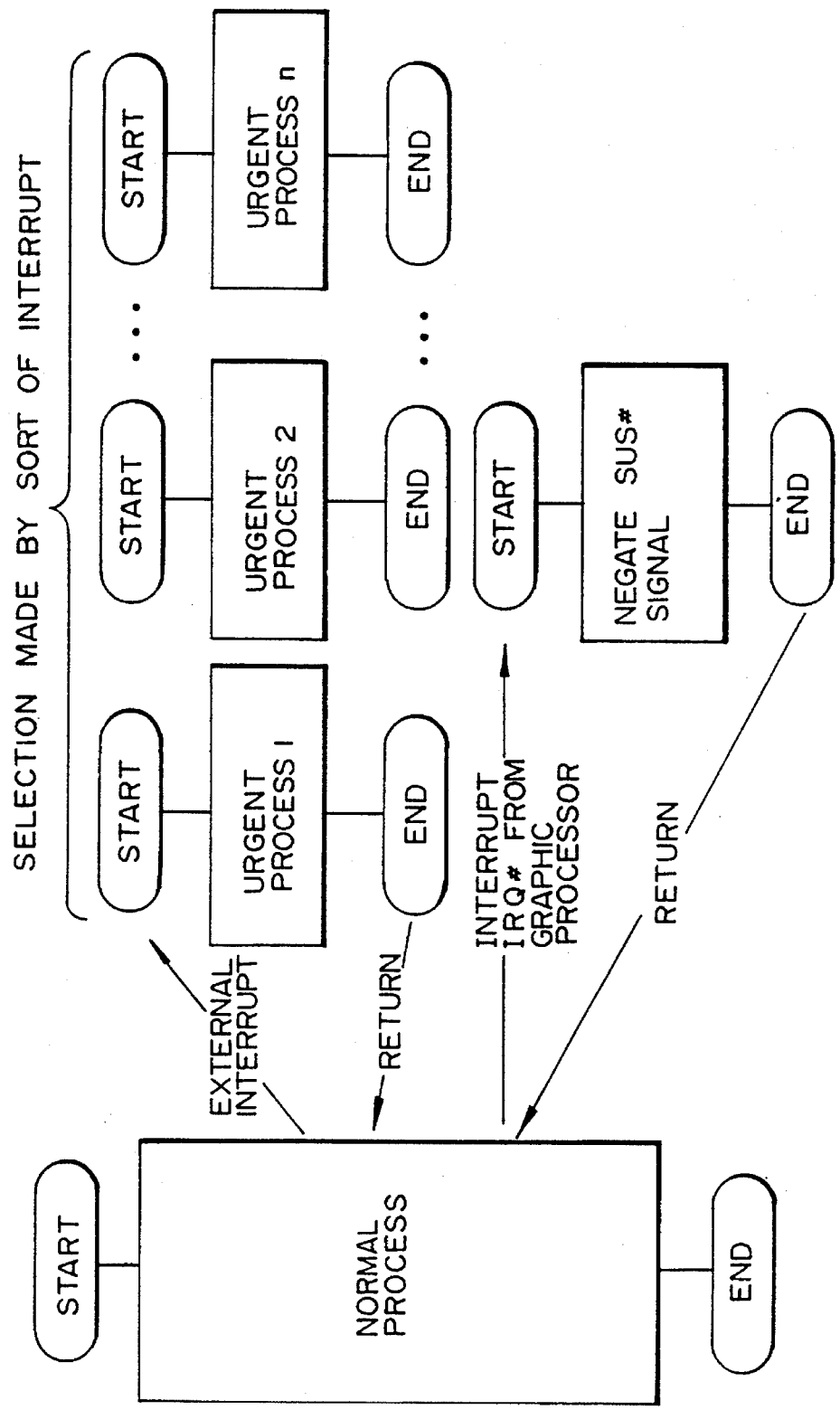
FIG. 23 is a flowchart for explaining a process flow of the MPU 201 corresponding to FIG. 22.

As represented in FIG. 21, there is not only one urgent process, but there are provided plural urgent processes, depending on the quantity of the interruption. Accordingly, the process to negate the SUS# signal must be provided with each of these interrupt routines. Although there is no problem if the software of the MPU 201 has been formed at the beginning under such an initial condition that the graphic processor 100 shown in this preferred embodiment is employed, there is a great problem in such a case that an additional portion of the negating process to the SUS# signal for the existing software is required in the additionally provided system. Therefore, it is desirable to employ a system in which modifications of the existing software are reduced as little as possible. FIG. 22 represents a hardware arrangement so as to solve such a problem. In FIG. 22, an interrupt signal IRQ# desired from a graphic processor 100B is connected to an interrupt control circuit 213B in contrast to the hardware arrangement shown in FIG. 18. When an SUS# signal is asserted, the above-described IRQ# signal is similarly asserted. The processing operation by the MPU 201 is performed by this way as represented in FIG. 23. Although the MPU 201 is once returned to the normal process after the interrupting process requested by the device (not shown) has been accomplished, the MPU 201 immediately performs a process for negating the SUS# signal by the interrupting process demanded by the graphic processor 100. As a result, the modifications of the existing software may be realized by merely adding to interrupt processing requested by the graphic processor 100.

Figure 24:
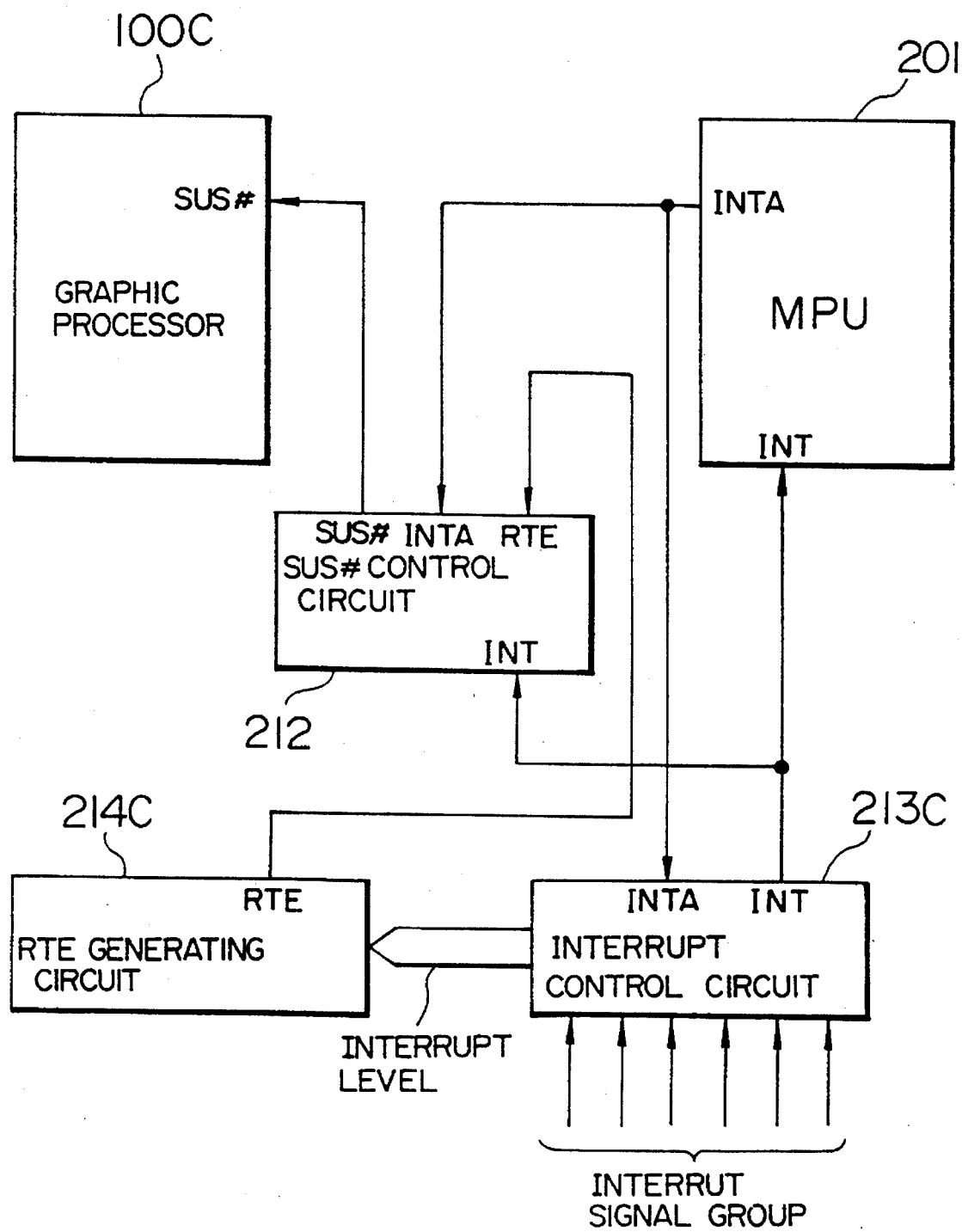
FIG. 24 is a schematic block diagram of an arrangement for depriving the software to control SUS# of MPU 201, in which an interrupt control circuit 213 outputs an interrupt level signal; and, FIG. 25 is a schematic block diagram of an arrangement with having a terminal indicating that MPU 201 has completed the interrupt process, for depriving the software to control SUS# of MPU 201.

Subsequently, a description will now be made of another method in which a process for negating an SUS# signal may be carried out without performing software. It is constructed that the MPU 201 decodes a priority level signal for interrupt at an RTE generating circuit 214C by employing an interrupt control circuit 213C having a function for outputting the priority level signal for the interrupt under execution. Since software which is operated on the MPU 201 in the circuit arrangement shown in FIG. 24 is so designed that the MPU 201 instructs an interrupt level to be executed for the interrupt control circuit 213C, there is no requirement to modify the software for negating the SUS# signal.

Figure 25:
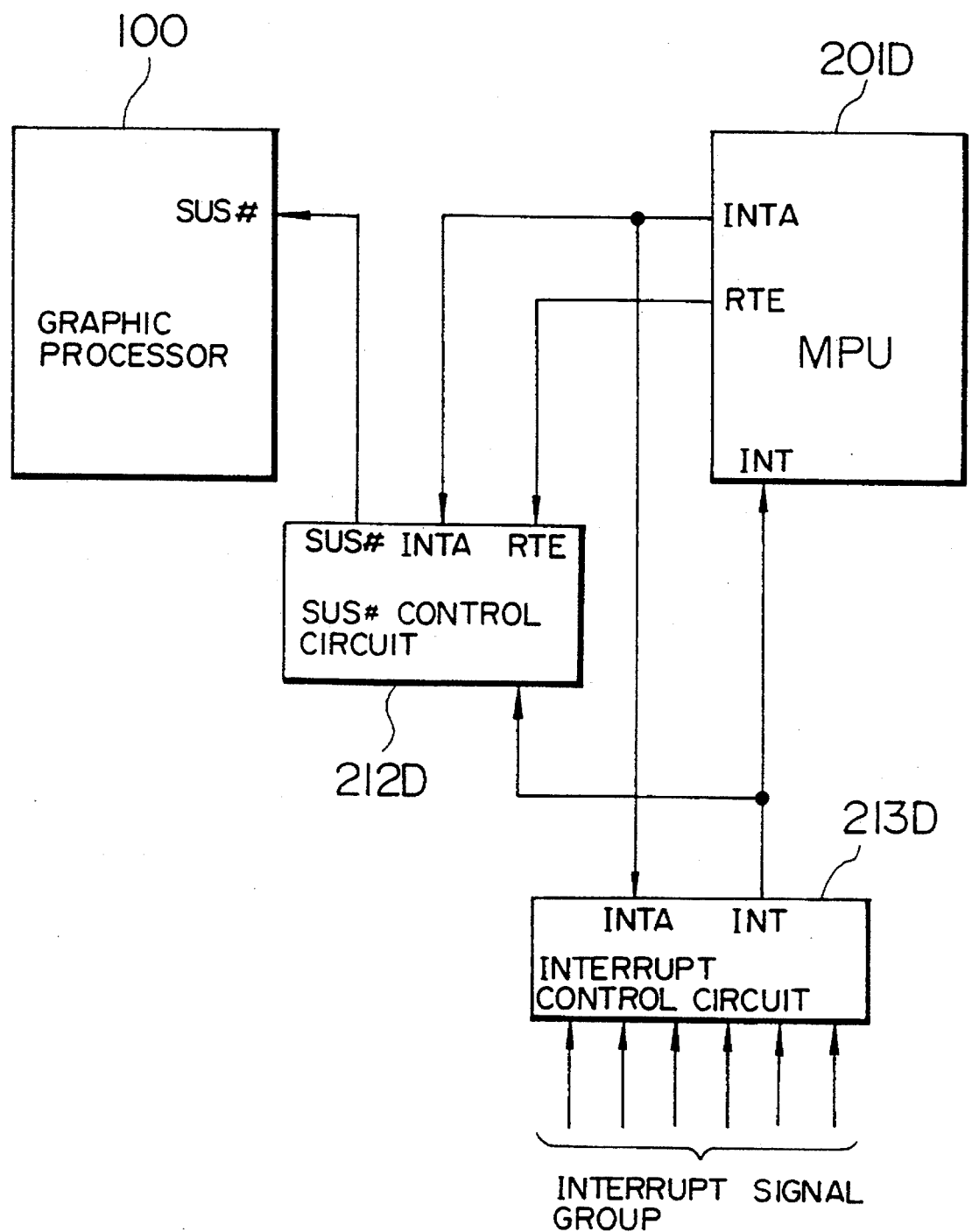

As another preferred embodiment, a description will now be made of such a case that MPU 201D owns a function to output an RTE signal corresponding to an interrupt process completion signal. Upon receipt of an interrupt signal derived from a device (not shown), the interrupt control signal 213D executes a judgement of a priority order, and thereafter interrupts the MPU 201D by an INT signal. An SUS# control circuit 212D asserts an SUS# terminal or pin of the graphic processor 100 by the INT signal. Subsequently, the MPU 201D executes the interrupt process and asserts an RTE terminal for a predetermined time when an interrupt end command is finally performed. The SUS# control circuit 212D negates the SUS# signal when each routine is completed and the RTE signal is asserted. As previously described, since no software processing operation is required with regards to a control of the SUS# signal according to the circuit arrangement shown in FIG. 25, the modifications of the existing software may be made little.

In accordance with the above-described preferred embodiment, in the system where the bit map data is transferred between the main memory 203 and frame buffer 205, when the interrupt process occurs in the MPU 201 while the graphic processor 100 executes the accessing operation of the system bus, the graphic processor owns the terminal (SUS#) for releasing the bus. As a result, since the graphic processor 100 can continuously use the system bus, the use efficiency of the system bus can be increased. Thus, as the modifications of the software for the existing system may be reduced, the graphic processor 100 may be readily added to this system.

What is claimed is:

1. A graphic processing system, comprising:

a main memory for storing address conversion information;

a buffer storage including a bit map memory;

a central processing unit for converting a virtual address to a physical address;

a graphic processor for transferring data between said main memory and said buffer storage and for converting a logical address represented by X-Y coordinates into a virtual address for accessing said main memory;

interface means for interfacing said central processing unit and said main memory to said graphic processor;

an address conversion unit, included in said graphic processor, for converting said virtual address into a physical address; and a register, included in said address conversion unit, for storing a base address of the address conversion information so that said address conversion unit can access the address conversion information in said main memory.

2. A graphic processing system, comprising:

a main memory for storing address conversion information;

a central processing unit for converting a virtual address to a physical address;

a graphic processor for transferring data in said main memory and for converting a logical address represented by X-Y coordinates into a virtual address for accessing said main memory;

interface means for interfacing said central processing unit and said main memory to said graphic processor;

an address conversion unit, included in said graphic processor, for converting said virtual address into a physical address; and a register, included in said address conversion unit, for storing a base address of the address conversion information so that said address conversion unit can access the address conversion information in said main memory.

3. A data processing apparatus, comprising:

a data processor for accessing data using a virtual address, processing the accessed data and outputting an image processing command and a virtual address designating predetermined image data in image data to be processed, to process the image data;

a main memory for storing data or a program;

an image memory for storing the image data; and an image processor including:

an image drawing unit for computing all virtual addresses of said image data to be processed in accordance with said virtual address designating predetermined image data, determining whether data corresponding to said computed virtual addresses are located in either of said main memory and said image memory, accessing said main memory if said computed virtual addresses are located in said main memory, accessing said image memory if said computed virtual addresses are located in said image memory, and processing said accessed data, and a memory management unit, including an address conversion unit for converting all of said computed virtual addresses to physical addresses, said memory management unit detecting a presence of conversion information to be converted in said address conversion unit, outputting to said data processor a request signal for reading said conversion information from said main memory when said presence of conversion information is not detected, and further outputting to said data processor a request signal for reading said conversion information from a secondary storage apparatus when said conversion information is not located in said main memory.

4. A data processing apparatus according to claim 3, wherein said address conversion unit previously stores a correspondence table between physical addresses and virtual addresses, and outputs a physical address, stored in said correspondence table, which corresponds to said computed virtual address.

5. A data processing apparatus, comprising:

a data processor for accessing data using a virtual address, processing the accessed data and outputting an image processing command and a virtual address designating predetermined image data in image data to be processed, to process the image data;

a main memory for storing data or a program;

an image memory for storing the image data;

a system bus for connecting said data processor with said main memory;

a bus arbitration unit for controlling use of said system bus in accordance with a request for using said system bus; and an image processor, connected to said system bus, including:

an image drawing unit for computing all virtual addresses of said image data to be processed in accordance with said virtual address designating predetermined image data, determining whether data corresponding to said computed virtual addresses are located in either of said main memory and said image memory, accessing said main memory if said computed virtual addresses are located in said main memory, accessing said image memory if said computed virtual addresses are located in said image memory, and processing a accessed data, a memory management unit, including an address conversion unit for converting all of said computed virtual addresses to physical addresses, said memory management unit detecting a presence of conversion information to be converted in said address conversion unit, outputting to said data processor a request signal for reading said conversion information from said main memory when said presence of conversion information is not detected in said address conversion unit, and further outputting to said data processor a request signal for reading said conversion information is not located in said main memory, and a bus control unit for outputting to said bus arbitration unit a request for using said system bus in order to read said conversion information from said main memory or said secondary storage apparatus.

6. A data processing apparatus according to claim 5, wherein said address conversion unit previously stores a correspondence table between physical addresses and virtual addresses, and outputs a physical address, stored in said correspondence table, which corresponds to said computed virtual address.

7. A data processing system, comprising:

a data processor for accessing data using a virtual address, processing the accessed data and outputting a image processing command and a virtual address designating predetermined image data in image data to be processed, to process the image data;

a main memory for storing data or a program;

an image memory for storing image data;

a system bus for connecting said data processor with said main memory;

a bus arbitration unit for controlling use of said system bus in accordance with a request for using said system bus; and an image processor, connected to said system bus, including:

an image drawing unit for computing all virtual addresses of said image data to be processed in accordance with said virtual address designating predetermined image data, determining whether data corresponding to said computed virtual addresses are located in either of said main memory and virtual addresses are located in said main memory, accessing said image memory if said computed virtual addresses are located in said image memory, and processing said accessed data, a memory management unit, including an address conversion unit for converting all of said computed virtual addresses to physical addresses, said memory management unit detecting a presence of conversion information to be converted in said address conversion unit, outputting to said data processor a request signal for reading said conversion information from said main memory when said presence of conversion information is not detected, and further outputting to said data processor a request signal for reading said conversion information from a secondary storage apparatus when said conversion information is not located in said main memory, a bus control unit for outputting to said bus arbitration unit a request for using said system bus in order to read said conversion information from said main memory or said secondary storage apparatus, and a display control unit for reading image data from said image memory to display said image data and outputting a synchronization signal for displaying said image data;

a video converter, connected to said image memory, for converting said data in said image memory to analog data by means of said display control unit; and a display apparatus for displaying said analog signal converted by said video converter, by means of said display control unit.

8. A data processing system according to claim 7, wherein said address conversion unit previously stores a correspondence table between physical addresses and virtual addresses, and outputs a physical address, stored in said correspondence table, which corresponds to said computed virtual address.

9. An image processor, comprising:

a data processor for accessing data using a virtual address, processing the accessed data and outputting an image processing command and a virtual address designating predetermined image data in image data to be processed, to process the image data;

an image drawing unit for computing all virtual addresses of said image data to be processed in accordance with said virtual address designating predetermined image data, determining whether data corresponding to said computed virtual addresses are located in either of a main memory storing either of data and a program and an image memory storing image data, accessing said main memory if said computed virtual addresses are located in said main memory, accessing said image memory if said computed virtual addresses are located in said image memory, and processing said accessed data;

a memory management unit, including an address conversion unit for converting all of said computed virtual addresses to physical addresses, said memory management unit detecting a presence of conversion information to be converted in said address conversion unit, outputting to said data processor a request signal for reading said conversion information from said main memory when said presence of conversion information is not detected, and further outputting to said data processor a request signal for reading said conversion information from a secondary storage apparatus when said conversion information is not located in said main memory;

a bus control unit for outputting, to a bus arbitration unit which controls use of said system bus, a request for using a system bus connected to said data processor, said main memory and said image processor, in order to read said conversion information from either of said main memory and said secondary storage apparatus; and a display control unit for reading image data from said image memory to display said image data, and outputting a synchronization signal for displaying said image data.

10. An image processor according to claim 9, wherein said address conversion unit previously stores a correspondence table between physical addresses and virtual addresses, and outputs a physical address, stored in said correspondence table, which corresponds to said computed virtual address.

11. A data processing apparatus, comprising:

a main memory for storing either of data and a program;

a data processor, including a first address conversion unit for converting a virtual address to a physical address in said main memory in order to access said main memory, said data processor accessing said main memory using a physical address produced by said first address conversion unit, processing said accessed data, and outputting an image processing command and a virtual address designating predetermined image data in image data to be processed, to process the image data;

an image memory for storing image data; and an image processor including:

an image drawing unit for computing all virtual addresses of said image data to be processed in accordance with said virtual address designating predetermined image data, determining whether data corresponding to said computed virtual addresses are located in either of said main memory and said image memory, accessing said main memory if said computed virtual addresses are located in said main memory, accessing said image memory if said computed virtual addresses are located in said image memory, and processing said accessed data, and a memory management unit, including an address conversion unit for converting all of said computed virtual addresses to physical addresses, said memory management unit detecting a presence of conversion information to be converted in said second address conversion unit, outputting to said data processor a request signal for reading said conversion information from said main memory when said presence of conversion information is not detected, and further outputting to said data processor a request signal for reading said conversion information from a secondary storage apparatus when said conversion information is not located in said main memory.

12. An image processor according to claim 11, wherein said address conversion unit previously stores a correspondence table between physical addresses and virtual addresses, and outputs a physical address, stored in said correspondence table, which corresponds to said computed virtual address.

13. A data processing apparatus, comprising:

a main memory for storing data or a program;

a data processor, including a first address conversion unit for converting a virtual address to a physical address in said main memory in order to access said main memory, said data processor accessing said main memory using a physical address produced by said first address conversion unit, processing said accessed data, and outputting an image processing command and a virtual address designating predetermined image data in image data to be processed, to process the image data;

an image memory for storing image data;

a system bus for connecting said data processor with said main memory;

a bus arbitration unit for controlling use of said system bus in accordance with a request for using said system bus; and an image processor, connected to said system bus, including:

an image drawing unit for computing all virtual addresses of said image data to be processed in accordance with said virtual address designating predetermined image data, determining whether data corresponding to said computed virtual addresses are located in either of said main memory and said image memory, accessing said main memory if said computed virtual addresses are located in said main memory, accessing said image memory if said computed virtual addresses are located in said image memory, and processing said accessed data, a memory management unit, including an address conversion unit for converting all of said computed virtual addresses to physical addresses, said memory management unit detecting a presence of conversion information to be converted in said second address conversion unit, outputting to said data processor a request signal for reading said conversion information form said main memory when said presence of conversion information is not detected, and further outputting to said data processor a request signal for reading said conversion information from a secondary storage apparatus when said conversion information is not located in said main memory, and a bus control unit for outputting, to said bus arbitration unit, a request for using said system bus in order to read said conversion information from either of said main memory and said secondary storage apparatus.

14. An image processor according to claim 13, wherein said address conversion unit previously stores a correspondence table between physical addresses and virtual addresses, and outputs a physical address, stored in said correspondence table, which corresponds to said computed virtual address.

15. A data processing system, comprising:

a main memory for storing data or a program;

a data processor, including a first address conversion unit for converting a virtual address to a physical address in said main memory in order to access said main memory, said data processor accessing said main memory using a physical address produced by said first address conversion unit, processing said accessed data, and outputting an image processing command and a virtual address designating predetermined image data in image data to be processed, to process the image data, an image memory for storing image data;

a system bus for connecting said data processor with said main memory;

a bus arbitration unit for controlling use of said system bus in accordance with a request for using said system bus;

an image processor, connected to said system bus, including:

an image drawing unit for computing all virtual addresses of said image data to be processed in accordance with said virtual address designating predetermined image data, determining whether data corresponding to said computed virtual addresses are located in either of said main memory and said image memory, accessing said main memory if said computed virtual addresses are located in said main memory, accessing said image memory if said computed virtual addresses are located in said image memory, and processing said accessed data, a memory management unit including an address conversion unit for converting all of said computed virtual addresses to physical addresses, said memory management unit detecting a presence of conversion information to be converted in said second address conversion unit, outputting to said data processor a request signal for reading said conversion information from said main memory when said presence of conversion information is not detected, and further outputting to said data processor a request signal for reading said conversion information from a secondary storage apparatus when said conversion information is not located in said main memory, a bus control unit for outputting to said bus arbitration unit a request for using said system bus in order to read said conversion information from said main memory or said secondary storage apparatus, and a display control unit for reading image data from said image memory to display said image data, and outputting a synchronization signal for displaying said image data;

a video converter, connected to said image memory, for converting said data in said image memory to analog data by means of said display control unit; and a display apparatus for displaying said analog signal converted by said video converter, by means of said display control unit.

16. An image processing system according to claim 15, wherein said address conversion unit previously stores a correspondence table between physical addresses and virtual addresses, and outputs a physical address, stored in said correspondence table, which corresponds to said computed virtual address.

17. An image processor, comprising:

a data processor, including a first address conversion unit for converting a virtual address to a physical address in said main memory in order to access said main memory, said data processor accessing said main memory using a physical address produced by said first address conversion unit, processing said accessed data, and outputting an image processing command and a virtual address designating predetermined image data in image data to be processed, to process the image data;

an image drawing unit for computing all virtual addresses of said image data to be processed in accordance with said virtual address designating predetermined image data, determining whether data corresponding to said computed virtual addresses are located in either of said main memory and said image memory, accessing said main memory if said computed virtual addresses are located in said main memory, accessing said image memory if said computed virtual addresses are located in said image memory, and processing said accessed data;

a memory management unit, including an address conversion unit for converting all of said computed virtual addresses to physical addresses, said memory management unit detecting a presence of conversion information to be converted in said second address conversion unit, outputting to said data processor a request signal for reading said conversion information from said main memory when said presence of conversion information is not detected, and further outputting to said data processor a request signal for reading said conversion information from a secondary storage apparatus when said conversion information is not located in said main memory;

a bus control unit for outputting, to a bus arbitration unit which controls use of said system bus, a request for using a system bus connected to said data processor, said main memory and said image processor, in order to read said conversion information from either of said main memory and said secondary storage apparatus; and a display control unit for reading image data from said image memory to display said image data, and outputting synchronization signal for displaying said image data.

18. An image processor according to claim 17, wherein said address conversion unit previously stores a correspondence table between physical addresses and virtual addresses, and outputs a physical address, stored in said correspondence table, which corresponds to said computed virtual address.

* * * * *